United States Patent
Shabanian et al.

(10) Patent No.: US 11,181,104 B2
(45) Date of Patent: Nov. 23, 2021

(54) MICRO VALVE FLUID PUMP, AND METHOD OF OPERATING A FLUID PUMP HAVING A DIAPHRAGM ATTACHED TO A BODY AND DEFLECTABLE TO OPEN AND CLOSE A FLUIDIC PATHWAY BY CONTACTING A VALVE SEAT HAVING A STRETCHABLE ELASTIC BODY WITH A CHANGING HEIGHT

(71) Applicant: Albert-Ludwigs-Universität Freiburg, Freiburg (DE)

(72) Inventors: Ardavan Shabanian, Freiburg (DE); Peter Woias, Freiburg (DE); Frank Goldschmidtböing, Ortenberg (DE)

(73) Assignee: Albert-Ludwigs-Universitat Freiburg, Freiburg (DE)

(*) Notice: Subject to any disclaimer, the term of this patent is extended or adjusted under 35 U.S.C. 154(b) by 0 days.

(21) Appl. No.: 16/351,906

(22) Filed: Mar. 13, 2019

(65) Prior Publication Data

US 2019/0203703 A1      Jul. 4, 2019

Related U.S. Application Data

(63) Continuation of application No. PCT/EP2017/072457, filed on Sep. 7, 2017.

(30) Foreign Application Priority Data

Sep. 13, 2016    (DE) .......................... 102016217435.5

(51) Int. Cl.
 *F04B 43/04*     (2006.01)
 *F04B 43/00*     (2006.01)
(Continued)

(52) U.S. Cl.
 CPC .......... *F04B 43/043* (2013.01); *F04B 19/006* (2013.01); *F04B 43/0027* (2013.01);
(Continued)

(58) Field of Classification Search
 CPC ...... F04B 43/02; F04B 19/006; F04B 43/043; F04B 53/1087; F04B 43/0027;
(Continued)

(56) References Cited

U.S. PATENT DOCUMENTS 3,412,754 A * 11/1968 Schou ..................... F01L 3/205
                                                    137/512.1
4,581,624 A * 4/1986 O'Connor ................. F15C 5/00
                                                    137/831

(Continued)

FOREIGN PATENT DOCUMENTS

DE    19534378 C1    1/1997
DE    19546570 C1    3/1997
(Continued)

OTHER PUBLICATIONS

Goldschmidtboing, F., et al., "A generic analytical model for micro-diaphragm pumps with active valves," Journal of Micromechanics and Microengineering, 15 (2005) 673-683 , published Feb. 2, 2005, 12 pages.

(Continued)

*Primary Examiner* — Patrick Hamo
*Assistant Examiner* — Benjamin Doyle
(74) *Attorney, Agent, or Firm* — Barley Snyder

(57) ABSTRACT

A fluid pump for pumping a fluid from an inlet toward an outlet comprises a pump body, a pump diaphragm, and a valve seat. The pump body has a first opening and a second opening. The pump diaphragm is attached to the pump body and forms a pump chamber between the pump body and the pump diaphragm. The pump chamber is fluidly connected to (Continued)

the inlet by the first opening and to the outlet by the second opening. The valve seat is disposed inside the pump chamber and around the second opening. The valve seat protrudes with an undeformed height from the second opening into the pump chamber in a direction toward the pump diaphragm. The valve seat has an elastic body and a gasket with a sealing surface. The pump diaphragm is deflectable and is adapted to open and close a fluidic pathway of the outlet by moving into and out of contact with the valve seat.

21 Claims, 16 Drawing Sheets

(51) Int. Cl.
*F04B 19/00* (2006.01)
*F16K 99/00* (2006.01)
*F04B 53/10* (2006.01)

(52) U.S. Cl.
CPC ...... *F04B 53/1087* (2013.01); *F16K 99/0015* (2013.01); *F16K 99/0046* (2013.01); *F16K 2099/0094* (2013.01)

(58) Field of Classification Search
CPC ......... F16K 2099/0094; F16K 99/0015; F16K 99/0046; F16K 7/14
USPC ...... 417/412, 413.1, 413.22, 413.3; 137/299, 137/601.04; 251/61.1, 61.2, 61.3, 61.4, 251/61.5
See application file for complete search history.

(56) References Cited

U.S. PATENT DOCUMENTS

| | | | | | |
|---|---|---|---|---|---|
| 4,943,032 | A | * | 7/1990 | Zdeblick | F15C 3/04 137/116.3 |
| 5,058,856 | A | * | 10/1991 | Gordon | F15C 5/00 251/11 |
| 5,069,419 | A | * | 12/1991 | Jerman | F15C 5/00 251/11 |
| 5,325,880 | A | * | 7/1994 | Johnson | F15C 3/04 137/1 |
| 5,333,831 | A | * | 8/1994 | Barth | F15C 5/00 251/11 |
| 5,378,120 | A | | 1/1995 | Taig | |
| 5,529,279 | A | * | 6/1996 | Beatty | F15C 5/00 251/11 |
| 5,585,011 | A | * | 12/1996 | Saaski | A61M 5/16881 210/490 |
| 5,628,411 | A | * | 5/1997 | Mills | B07C 5/3425 209/644 |
| 5,785,295 | A | * | 7/1998 | Tsai | F15C 5/00 251/11 |
| 6,189,858 | B1 | * | 2/2001 | Miyazoe | F16K 15/185 251/129.06 |
| 6,227,824 | B1 | * | 5/2001 | Stehr | F04B 7/04 417/540 |
| 6,736,370 | B1 | * | 5/2004 | Crockett | F16K 27/003 251/129.17 |
| 6,837,476 | B2 | * | 1/2005 | Cabuz | F15C 5/00 251/129.01 |
| 6,991,214 | B2 | * | 1/2006 | Richter | F15C 5/00 251/129.06 |
| 7,445,017 | B2 | * | 11/2008 | Cabuz | F16K 7/14 137/14 |
| 8,007,704 | B2 | * | 8/2011 | Smith | B29C 45/14811 264/272.11 |
| 9,546,743 | B2 | * | 1/2017 | Livermore-Clifford | F16K 99/0032 |
| 2007/0187634 | A1 | * | 8/2007 | Sneh | F16K 31/003 251/30.01 |
| 2007/0219597 | A1 | * | 9/2007 | Kamen | A61M 5/14224 607/60 |
| 2011/0168936 | A1 | | 7/2011 | Reichenbach et al. | |
| 2012/0244454 | A1 | * | 9/2012 | Maeda | F16K 15/185 429/513 |
| 2013/0068325 | A1 | * | 3/2013 | Herz | F16K 99/0015 137/565.01 |
| 2013/0186078 | A1 | * | 7/2013 | Lemke | F16K 99/0015 60/325 |
| 2015/0167664 | A1 | * | 6/2015 | Yokoi | F04B 53/103 417/571 |
| 2018/0266512 | A1 | * | 9/2018 | Zimmer | E05F 3/10 |
| 2020/0130209 | A1 | * | 4/2020 | Maurer | F16K 31/003 251/30.01 |

FOREIGN PATENT DOCUMENTS

DE    10202996 A1    8/2003
DE    102005038483 B3    12/2006

OTHER PUBLICATIONS

Laser, D. J., et al., "A review of micropumps," Journal of Micromechanics and Microengineering, 14 (2004) R35-R64, published Apr. 19, 2004, 30 pages.
Stemme, Erik, et al., "A valveless diffuser/nozzle-based fluid pump," Sensors and Actuators A, 39 (1993) 159-167, accepted Apr. 6, 1993, 9 pages.
Woias, Peter, "Micropumps—past, progress, and future prospects," Sensors and Actuators B 105 (2005) 28-38, available online May 6, 2004, 11 pages.
Zengerle, R., et al., "A bidirectional silicon micropump," Sensors and Actuators A 50 (1995) 81-86, accepted Sep. 21, 1995, 6 pages.
German Office Action, dated Aug. 3, 2017, 4 pages.

* cited by examiner

| Figure | Position of diaphragm | V | $Q_1$ | $Q_2$ |
|---|---|---|---|---|
| 3A | up | $V_{up}$ | 0 | 0 |
| 3B | close | $V_{close}$ | $(V_{up}-V_{close})*(\alpha)$ | $(V_{up}-V_{close})*(1-\alpha)$ |
| 3C | down | $V_{down}$ | $(V_{close}-V_{down})$ | 0 |
| 3D | open | $V_{open}$ | $(V_{down}-V_{open})$ | 0 |
| 3E | up | $V_{up}$ | $(V_{open}-V_{up})*(\alpha)$ | $(V_{open}-V_{up})*(1-\alpha)$ |
| Sum | | | $-(V_{open}-V_{close})*(1-\alpha)$ | $(V_{open}-V_{close})*(1-\alpha)$ |
FIG. 4
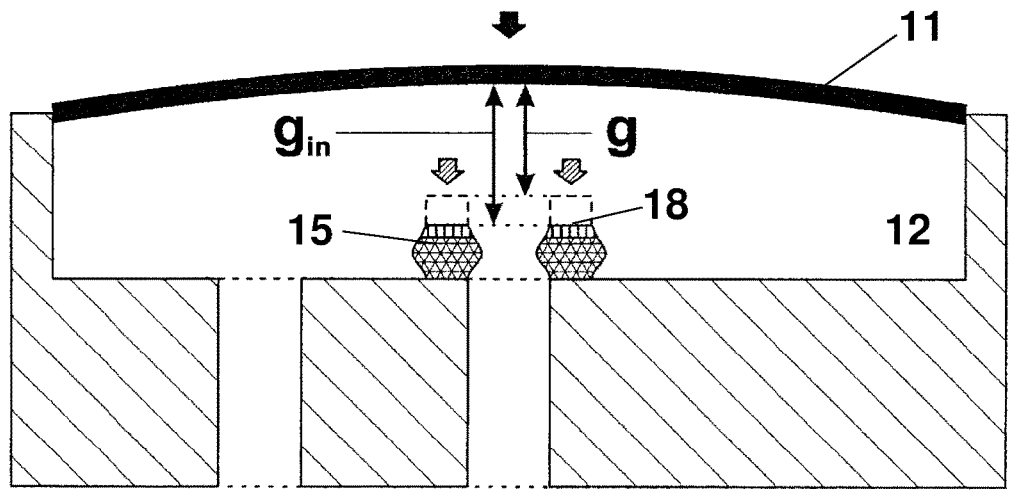
FIG. 5A
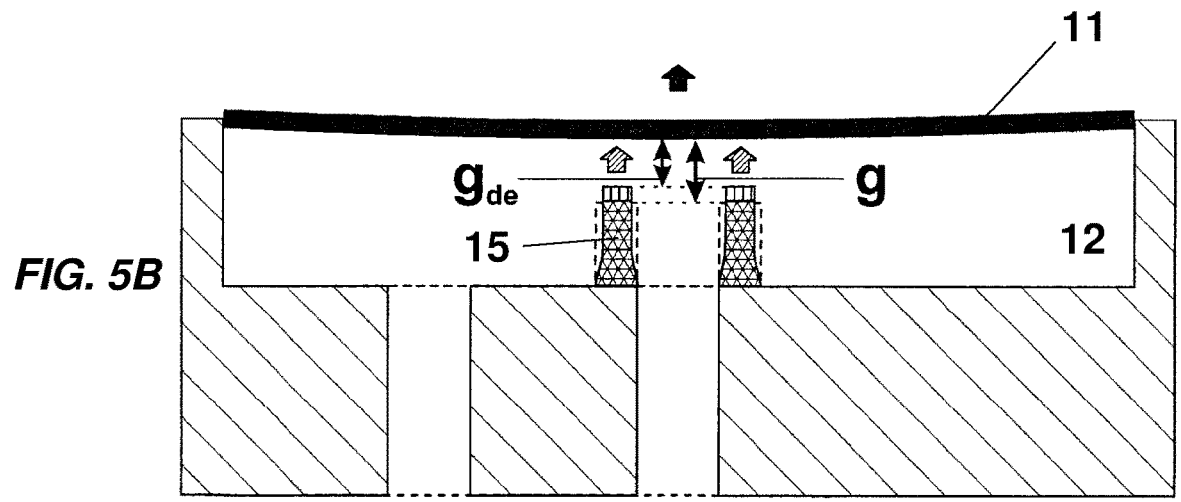
FIG. 5B

MICRO VALVE FLUID PUMP, AND METHOD OF OPERATING A FLUID PUMP HAVING A DIAPHRAGM ATTACHED TO A BODY AND DEFLECTABLE TO OPEN AND CLOSE A FLUIDIC PATHWAY BY CONTACTING A VALVE SEAT HAVING A STRETCHABLE ELASTIC BODY WITH A CHANGING HEIGHT

CROSS-REFERENCE TO RELATED APPLICATIONS

This application is a continuation of PCT International Application No. PCT/EP2017/072457, filed on Sep. 7, 2017, which claims priority under 35 U.S.C. § 119 to German Patent Application No. 102016217435.5, filed on Sep. 13, 2016.

FIELD OF THE INVENTION

The present invention relates to a fluid pump for pumping a fluid from an inlet towards an outlet. The present invention further relates to a method of operating such a fluid pump, and to a microvalve that can be used with micropumps.

BACKGROUND

A microvalve pump (µVP) device can be used in a wide range of applications for fluid dosing, handling, and manipulation. Such a device can be applied in fields such as the life sciences, as a micropump and/or a microvalve in a chemical analysis system. Other exemplary applications include pumping ink in high-throughput inkjet printers, feeding lubricants to rotating bearings, or sampling gas for chemical gas analysis. In all application areas, the device can be utilized as a high performance valve, to actively open or close a flow or as an extraordinary high flowrate one-directional micropump to pump fluid from input to output.

Mechanical reciprocating displacement pumps are described in publication [1]: P. Woias, Micropumps—past, progress and future prospects, *Sensors and Actuators* B 105, 2005, 28-38 and in publication [2]: D. J. Laser and J. G. Santiago, A review of Micropumps, *Journal of Micromechanics and Micro-engineering* 14, 2004, R35-R64. FIG. 1 in publication [1] and FIG. 2 in publication [2] show the general, common design principle of the majority of reciprocating micropumps: at least one pump diaphragm is mounted at one side of a pump chamber and displaced in a reciprocating manner to generate an alternating overpressure and underpressure in the pump chamber. Two active or passive valves are located between a fluidic inlet to the pump chamber and a fluidic outlet from the pump chamber, respectively. The timing of the opening and closure of these valves is made in such a way that underpressure in the pump chamber will suck fluid into the pump chamber through the open inlet valve, while the outlet valve is closed. Overpressure in the pump chamber will deliver fluid from the pump chamber to the outlet through the open outlet valve, while the inlet valve is closed.

Actuation principles for this general type of a displacement micropump are a manifold as disclosed in publication [1] and publication [2], using piezoelectric, electromagnetic, thermopneumatic or electrostatic actuation. In principle, every actuation concept can be applied that allows to displace a diaphragm in a reciprocating manner, no matter whether the respective actuator is integral part of the pump diaphragm or realized as a separate unit mechanically or energetically coupled to the pump diaphragm. Also, valves can be made of a very different shape and design.

As disclosed in documents [1] and [2], three different types of valves are used currently.

Firstly, passive flap valves are opened and closed by the underpressure and overpressure in the pump chamber. Usually these passive valves produce a unidirectional flow between inlet and outlet, as they are unidirectional in their nature. However, it is also shown in publication [3]: R. Zengerle et al., A bidirectional silicon micropump, *Sensors and Actuators* A50, 1995, 81-86 that dynamic effects can generate a reverse flow from the outlet to the inlet also in micropumps with flap valves. The physical effect behind is a time lag of the pressure-triggered flap movement with respect to the pump diaphragm movement, generated via inertial effects and fluidic damping of the flap movement.

A second type of valve are active valves that are equipped with their own actuation mechanism and opened or closed on demand. Such micropumps are frequently referred as peristaltic micro-pumps, as they mimic the operation of roller or tubing pumps. They do also allow for a bidirectional flow by appropriate timing of the valve opening and closure with respect to the operation of the pump diaphragm.

A third type of valve are nozzle-diffuser valves. These valves are discriminated from the other two types by the fact that they do not allow for a complete closure. Instead they are built from fluidic channels or orifices with a shape that provides different fluidic resistances for a forward and backward flow. Well-known examples are channels with a conical shape as described in publication [4]: E. Stemme, G. Stemme, A valveless diffuser/nozzle-based fluid pump, *Sensors and Actuators* A 39, 1993, 159-167.

The micropumps described so far use separated pump diaphragms and valve units as a common feature. However, it has to be mentioned that peristaltic micropumps employing active diaphragm valves will also use the fluid displacement of these diaphragms for fluid propellation. Therefore, these valves take in part the function of a pump diaphragm. This is documented in publication [5]: F. Goldschmidtböing et al., A generic analytical model for micro-diaphragm pumps with active valves, *Journal of Micromechanics and Microengineering* 15 (4), 2005, 673-683, there in FIG. 2. In any version, however, the reciprocating micropumps described above present several disadvantages.

The combination of pumping diaphragm, pump chamber and two fluidic valves leads to relatively complex designs and fabrication technologies, especially if miniaturization in a micropump is the goal. Also, defect and error sources are increased, as for instance by the blocking of valves with particles, the entrapment of fluid bubbles inside the fluidic system, or the failure of a micropump due to the malfunction of only one of the functional parts (fracture of one flap or damage in the diaphragm actuator).

Micropumps with active valves are much more complex than micropumps with passive valves and need an electronic driver with higher complexity.

Micropumps with nozzle-diffuser valves exhibit an open fluid passage between inlet and outlet port. Any forward or backpressure between inlet and outlet port will generate unwanted parasitic flow during this time, with potentially unwanted effects and a reduced pumping performance.

Publication [6] DE 195 46 570 C1 shows, as a step towards the reduction of design complexity, a micropump exploiting a combined pumping and valve effect of a single diaphragm valve. The device uses an elastic and actuated diaphragm mounted on top of a fluidic chamber. The chamber has a fluidic inlet and a fluidic outlet. The fluidic outlet can be closed via actuation of the diaphragm which carries a mechanically rigid boss in its center, facing the pump chamber. When the valve diaphragm is moved downward, towards the pump chamber, the boss is pressed onto the outlet opening thereby obstructing the fluidic connection between pump chamber and outlet port. When the diaphragm is moved upward, the valve boss is moved away from the outlet opening, thus opening the fluid duct between pump chamber and outlet port. The outlet opening therefore acts as a valve seat and the active valve is formed by the interaction of the valve seat with and the valve boss located at the actuated diaphragm.

As explained in document [6], a pumping mechanism of this valve is generated by the fact that the fluidic resistance of the path between valve boss and valve seat depends in a nonlinear fashion from the distance h between both and from the pressure difference p over the outlet valve. In a simplified model the flow is proportional to $ph^3$, in a more complex model it is proportional to $p^x h^y$, with x and y as numerical model parameters. In contrary to that the inlet opening is showing the fluidic characteristic of an orifice, with a flow proportional only to the product of the square root of the pressure difference over the orifice and the constant effective cross sectional area of the inlet opening. As this is similar to the design of peristaltic micropumps, it is expectable that the same pumping mechanism will also be found in the devices shown in publication [5].

The movement of the valve boss from the opened to the closed position will therefore generate a highly nonlinear increase of the fluidic resistance over time, due to the sharp decrease of the parameter $h^3$. On the other hand, the movement of the valve boss from the closed to the opened position will generate a highly nonlinear decrease of the fluidic resistance. The fluidic resistance of the inlet opening does only depend on the pressure difference over the inlet opening. Therefore, as explained in publication [6], during the suction phase an opening of the valve will generate a high underpressure in the fluidic chamber, while the almost closed outlet valve presents a relatively high fluidic resistance and while the inlet opening will present a lower fluidic resistance. As a result, fluid will be sucked preferentially from the inlet into the fluidic chamber, with a smaller contribution of fluid sucked back from the outlet into the fluidic chamber. As the underpressure in the fluidic chamber is eventually decreasing to zero due to this influx, the net influx will happen via the inlet.

During the delivery phase, a closure of the valve will generate a high instantaneous overpressure in the fluidic chamber, while the open outlet valve presents a low fluidic resistance and while the inlet opening has to present a higher fluidic resistance than the outlet valve. The result is a higher outflux of fluid into the outlet port, compared to the influx during the suction phase, and consequently a smaller backflow of fluid into the inlet port. The total net flow during a pump cycle will be towards the outlet.

Publication [6] reveals several drawbacks of the valve-micropump concept presented there.

The micropumping effect depends on a delicate balance between the dynamic variations of the pump chamber pressure, the dynamic change of the gap height between valve boss and valve seat, and the dynamic variation of the flow through the inlet port. This presents design constraints, as only a tailored set of parameters will lead to a pumping effect.

The fluidic resistance of the inlet port and the fluidic resistance of the open outlet port have to be matched in such a way that a net outflux is present in total. To achieve that, the inlet opening has to be limited in its size, which in contrary limits the influx of fluid during the suction phase.

The pump chamber pressure has to be set to certain maximal and minimal values for certain time periods of the suction and delivery phase, to achieve the desired net influx and outflux. This puts requirements on the diaphragm stroke and the diaphragm actuator performance. Publication [6] proposes controlled variations of the diaphragm stroke to tailor the pump chamber pressure. This will complicate the electronic driver for the actuator.

The micropump according to publication [6] shows large time periods with an open fluid passage between inlet and outlet port. Any forward or backpressure between inlet and outlet port will generate un-wanted parasitic flow during this time periods, with potentially unwanted effects and a reduced pumping performance.

In the suction phase, the pump according to FIG. 1 of publication [6] will only start building an under pressure in the pump chamber when the outlet valve is opened. This is clearly visible from FIG. 1 in [6] and can also be derived from FIG. 8 in [6]. In FIG. 1 of [6] the cantilever-type piezoactuator will not be able to deform the pump diaphragm before the valve boss is moved upwards. In FIG. 8 of [6] the rigid valve boss will significantly hinder deformation of the elastic pump diaphragm in the upward movement. Therefore, volume will only be transported, if both valves are open at the same time, with the disadvantage of unwanted backward flow and backward pumping.

Publication [7] US 2013/0186078 A1 discloses a micro-valve which has an elastically de-formable valve lip. This micro-valve is formed from two firmly connected substrates and prefer-ably has an actuator element, for example that is diaphragm-driven, for the controlled opening and closing of a first and/or second passage. This document further relates to a method for producing such a micro-valve and to a micro-pump which uses at least one such micro-valve. Said micro-pump is intended to be used in particular in conjunction with the development of an artificial sphincter. The micro-valve has a first substrate and a second substrate which are non-detachably joined to each other in order to form a controllable fluid flow section, and at least one first passage and at least one second passage. According to the invention, the micro-valve has at least one elastically deformable seal structure which, for example, can be formed by a photo-structurable silicone, to seal off the first and/or second passage. Document [7], however, only discloses using relatively thin photostructured valve lips, which cannot be elongated in a vertical direction for achieving a pumping action based on a first opening and only one valve seat around a second opening.

SUMMARY

A fluid pump for pumping a fluid from an inlet toward an outlet comprises a pump body, a pump diaphragm, and a valve seat. The pump body has a first opening and a second opening. The pump diaphragm is attached to the pump body and forms a pump chamber between the pump body and the pump diaphragm. The pump chamber is fluidly connected to the inlet by the first opening and to the outlet by the second opening. The valve seat is disposed inside the pump chamber and around the second opening. The valve seat protrudes with an undeformed height from the second opening into the pump chamber in a direction toward the pump diaphragm. The valve seat has an elastic body and a gasket with a sealing surface. The pump diaphragm is deflectable and is adapted to open and close a fluidic pathway of the outlet by moving into and out of contact with the valve seat.

BRIEF DESCRIPTION OF THE DRAWINGS

The invention will now be described by way of example with reference to the accompanying figures, of which:

FIG. 4 is a table of displaced volumes during the pumping cycle shown in FIGS. 3A-3E;

FIG. 5A is a sectional side view of the pump in a first position in a second pumping effect;

FIG. 5B is a sectional side view of the pump in a second position in the second pumping effect;

DETAILED DESCRIPTION OF THE EMBODIMENT(S)

The accompanying drawings are incorporated into and form a part of the specification to illustrate embodiments of the present invention. These drawings together with the description explain the principles of the invention. The drawings, however, are merely for the purpose of illustrating the examples of how the invention can be made and used and are not to be construed as limiting the invention to only the illustrated and described embodiments. Several aspects of the described embodiments may form—individually or in different combinations—solutions according to the present invention. Further features and advantages will become apparent from the following description of the various embodiments of the invention, as illustrated in the accompanying drawings, in which like reference numbers refer to like elements.

Throughout the description, the following terms will be understood according to the following definitions. With "rigid" as used in this application is meant stiff, unyielding, i.e. a rigid structure is not adapted to be deformable during normal use of the structure. With "flexible" as used in this application is meant non-stiff, non-rigid, i.e. bendable but not stretchable. A flexible structure is adapted to be deformable in a certain direction during normal use of the structure, but does not elongate. The length does not change during bending. With "stretchable" as used in this application is meant resilient, i.e. elastically deformable with elongation. A stretchable structure is adapted to be elastically deformed during normal use (with elongation). With "compressible" as used in this application is meant resilient, i.e. elastically deformable with a reduction of size in the direction of an applied pressure. A stretchable structure is adapted to be elastically deformed during normal use (with reduction of dimension).

Figure 1:
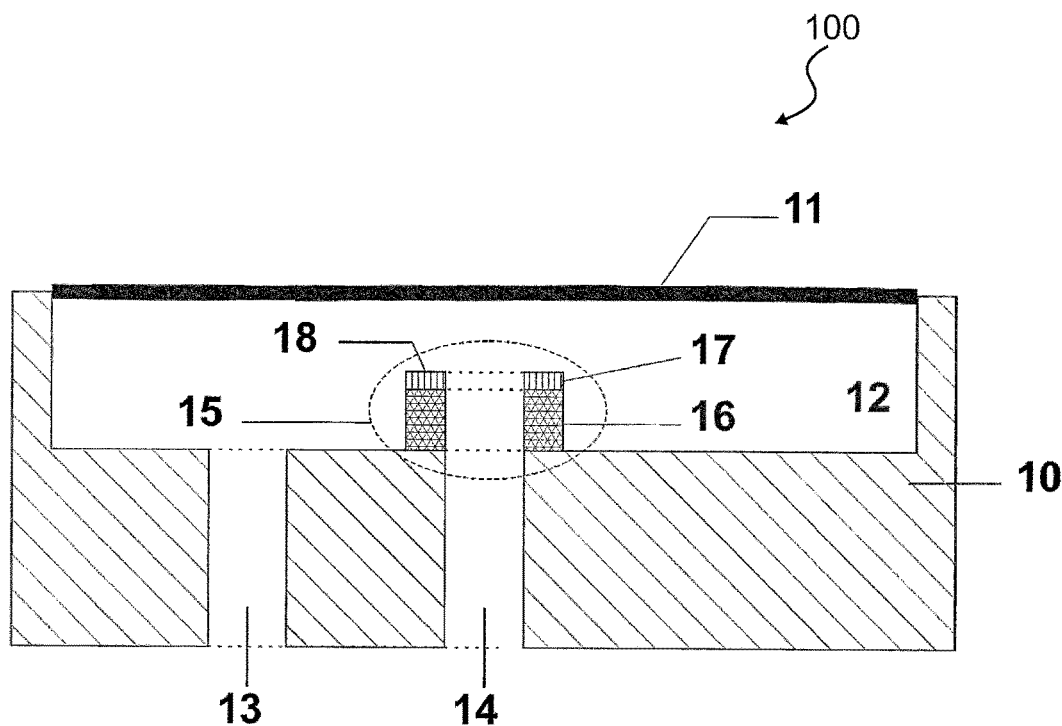
FIG. 1 is a sectional side view of a pump according to an embodiment.

A first position of a fluid pump 100 according to an embodiment is shown in FIG. 1. The pump 100 comprises a pump body 10 and a pump diaphragm 11 which is adapted to be secured to the pump body 10. A pump chamber 12 is defined between the pump body 10 and the pump diaphragm 11.

The diaphragm 11 can move upwards and downwards; the diaphragm 11 can be deflected towards a pair of openings 13, 14 of the pump 100 shown in FIG. 1 and away from the openings 13, 14. The pump chamber 12 is fluidly connected to an inlet and outlet, respectively, via a first opening 13 and a second opening 14. An elastic valve seat 15, having a valve seat body 16 and a gasket 17 with a sealing surface 18, is implemented in the pump body 10 so that at least a part of the valve seat 15 protrudes towards the pump diaphragm 11 from the second opening 14. The pump diaphragm 11 is adapted to close and open the outlet fluidic pathway of the second opening 14, by respectively coming into physical contact with the valve seat 15, or even pressing it, and by moving away from the valve seat 15. The second opening 14 is concentric with the diaphragm 11.

Figure 2:
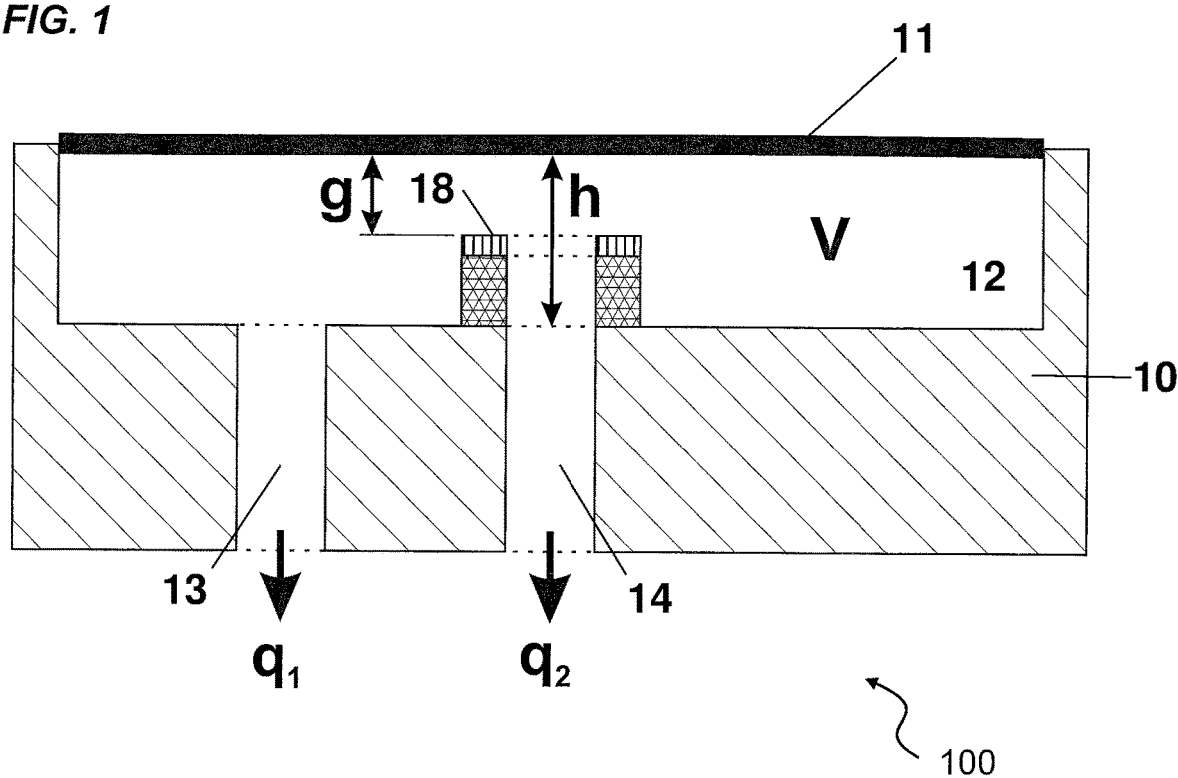
FIG. 2 is another sectional side view of the pump of FIG. 1.

As shown in FIG. 2, the pump chamber 12 has a volume V defined between the pump body 10 and the diaphragm 11. This volume V increases when the diaphragm 11 moves upwards, and decreases when the diaphragm 11 moves downwards. Movement of diaphragm 11 can be described by defining a height h, which is a distance between a bottom of the pump chamber 12 and a central point of the diaphragm 11. The distance h increases when the diaphragm 11 moves upwards, and decreases when the diaphragm 11 moves downwards. This change in the volume V of the chamber 12 leads to volume flows q1 and q2 through inlet 13 and outlet 14, respectively. The sign for the volume flow q1, q2 is considered to be positive when the fluid is exiting the pump chamber 12, as it is shown in FIG. 2. The distance between the sealing surface 18 of the valve seat 15 and the deflectable pump diaphragm 11 is designated as gap width g.

A working principle of the pump 100 in a first pumping effect is shown in FIGS. 3A-3E, which is based on the difference between the opening and closing states of the valve. A full cycle of pumping is described below, starting from the status where the diaphragm 11 is positioned upwards. In each state, the height h and volume V corresponding to the respective state is considered. The table in FIG. 4 summarizes these quantitative parameters.

Figure 3:
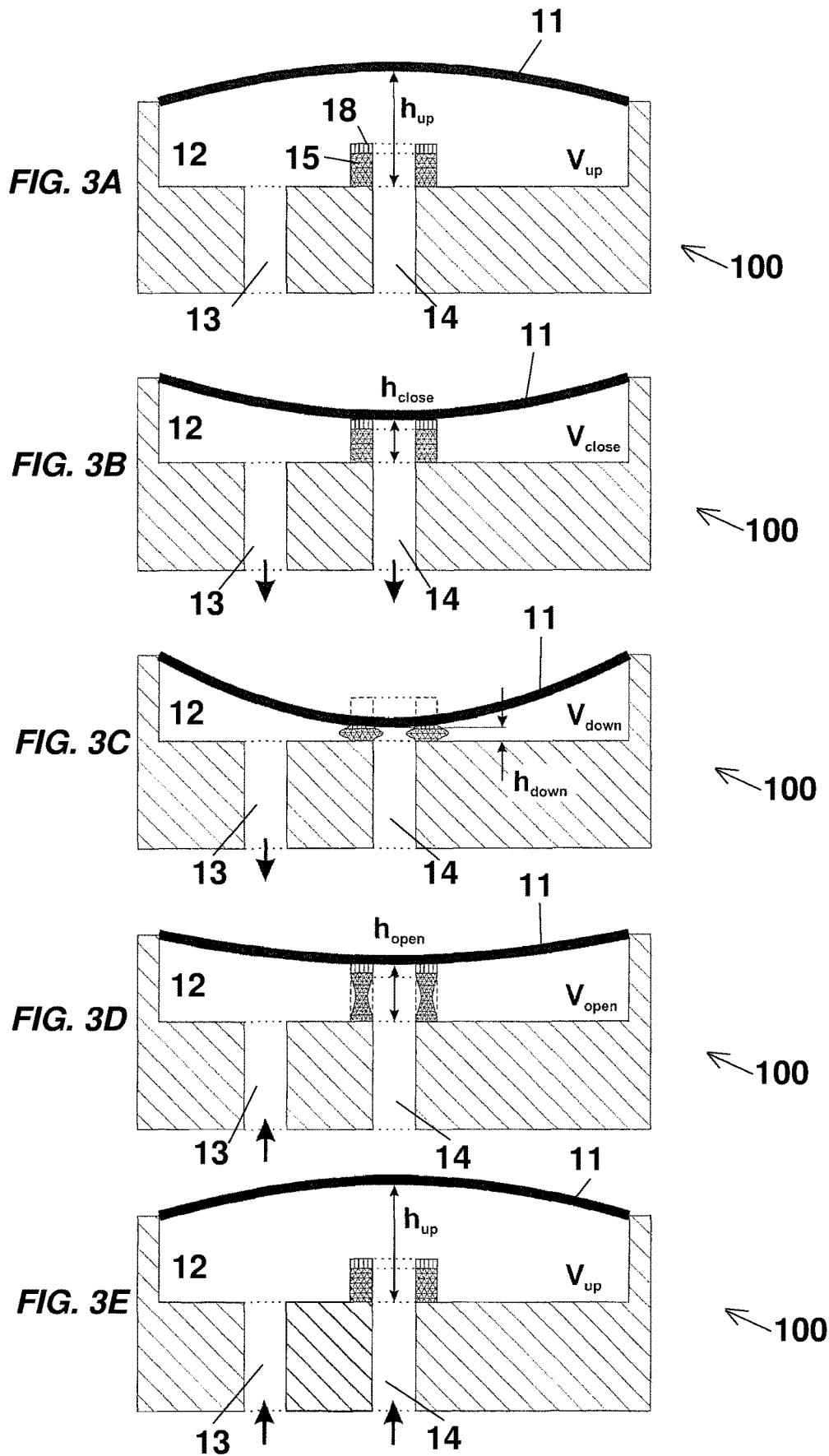
FIG. 3A is a sectional side view of a starting condition of the pump during a pumping cycle.
FIG. 3B is a sectional side view of a second condition of the pump during the pumping cycle.
FIG. 3C is a sectional side view of a third condition of the pump during the pumping cycle.
FIG. 3D is a sectional side view of a fourth condition of the pump during the pumping cycle.
FIG. 3E is a sectional side view of an initial position of the pump during the pumping cycle.

For a more transparent explanation and in order to focus on the first presented effect and its benefits, we neglect the dynamic change in the fluidic resistance of inlet 13 and outlet 14 and dynamic changes of the pressures in the system in the description with reference to FIGS. 3A-3E. Fluid that is displaced in the outlet 14 while the outlet valve is closed, as in FIGS. 3C and 3D, is also neglected. Neglecting the dynamic changes in the resistances, the displaced volume $V_{up}-V_{close}$ will be transferred through the inlet and outlet connections 13 and 14 inversely proportional to their resistances, when both connections are open. If $R_i$ is the effective fluidic resistance of inlet 13, and $R_o$ is the effective fluidic resistance of outlet 14, with $\alpha$ defined as $R_o/(R_o+R_i)$, the change of volume in chamber $\Delta V$ results in a volume flow $(\Delta V)*\alpha$ through inlet 13, and $(\Delta V)*(1-\alpha)$ through outlet 14.

In a starting condition shown in FIG. 3A, the diaphragm 11 is deflected upwards to the height of $h_{up}$, with reference to the bottom plane of the pump chamber 12, while the volume of the chamber 12 is in its maximum state $V_{up}$. The pump 100 can be set to be normally open, i.e. having a fluidic connection between the inlet 13 and outlet 14 in the unactuated status of the diaphragm 11, if there is a gap between the diaphragm 11 and the seat 15 in the natural position. In another embodiment, it can also be set to be normally closed, i.e. having no fluidic connection between the inlet 13 and outlet 14 in the unactuated status of the diaphragm 11, if the diaphragm 11 is sitting on the seat 15 in the natural position.

When the diaphragm 11 starts to move downwards, it will land first on the sealing surface 18 of the elastic valve seat 15 at the height of $h_{close}$, while the chamber has the volume $V_{close}$, as is shown in FIG. 3B. This movement leads to a fluid displacement out of the pump chamber 12, both through inlet 13 and outlet 14.

The diaphragm 11 pushes further down and compresses the elastic valve seat 15 to reach the state shown in FIG. 3C, with the height of $h_{down}$ and chamber volume of $V_{down}$. All volume displacement from the pump chamber 12 passes through inlet 13, as the outlet 14 is closed.

If the diaphragm 11 moves upwards again, as shown in FIG. 3D, the elastic valve seat 15 will decompress and elongate, due to its elastic behavior and attachment to the diaphragm 11. It elongates to the height $h_{open}>h_{close}$, where the sealing surface 18 of the valve seat 15 starts to separate from the diaphragm 11. Still all the volume displacement from the pump chamber 12 passes through inlet 13, where fluid is sucked into the pump chamber 12, as the outlet 14 is still closed.

The diaphragm 11 then moves upwards to reach the initial position shown in FIG. 3E with the height $h_{up}$ to complete the cycle. In this phase fluid is entering the pump chamber 12 both from the inlet 13 and the outlet 14, now with opposite signs of the flow direction as compared to FIG. 3B.

A method of operating the fluid pump 100 comprises:
actuating the deflectable diaphragm 11 to move towards the valve seat 15 until it comes into sealing contact with the gasket 17, and further actuating the deflectable diaphragm 11 to move until the valve seat 15 is compressed so as to have a reduced height compared to the undeformed height of the valve seat 15, actuating the deflectable diaphragm 11 to move away from the valve seat 15 until the deflectable diaphragm 11 loses contact with the gasket 17, wherein during this movement, the valve seat 15 is stretched so as to have an elongated height compared to said undeformed height, and repeating steps a) and b) for pumping a fluid from the inlet 13 towards the outlet 14. The backflow from the outlet 14 can be kept low and the pump resists also high counter pressures at the outlet 14.

FIG. 4 shows different volume displacements through the inlet 13 and the outlet 14 for all phases of a pump cycle. One full cycle delivers a net flow of $(V_{open}-V_{close})*(1-\alpha)$ from inlet to outlet. In the table in FIG. 4 a negative sign for the net flow of the inlet 13 describes fluid entering through the inlet 13, and a positive sign for the net flow of the outlet 14 means that fluid exits through the outlet 14.

A working principle of the pump 100 in a second pumping effect is shown in FIGS. 5A and 5B. The second pumping effect is based on a transient deformation of the elastic seat 15 in the suction and delivery phases of the pump 100.

Figure 6A:
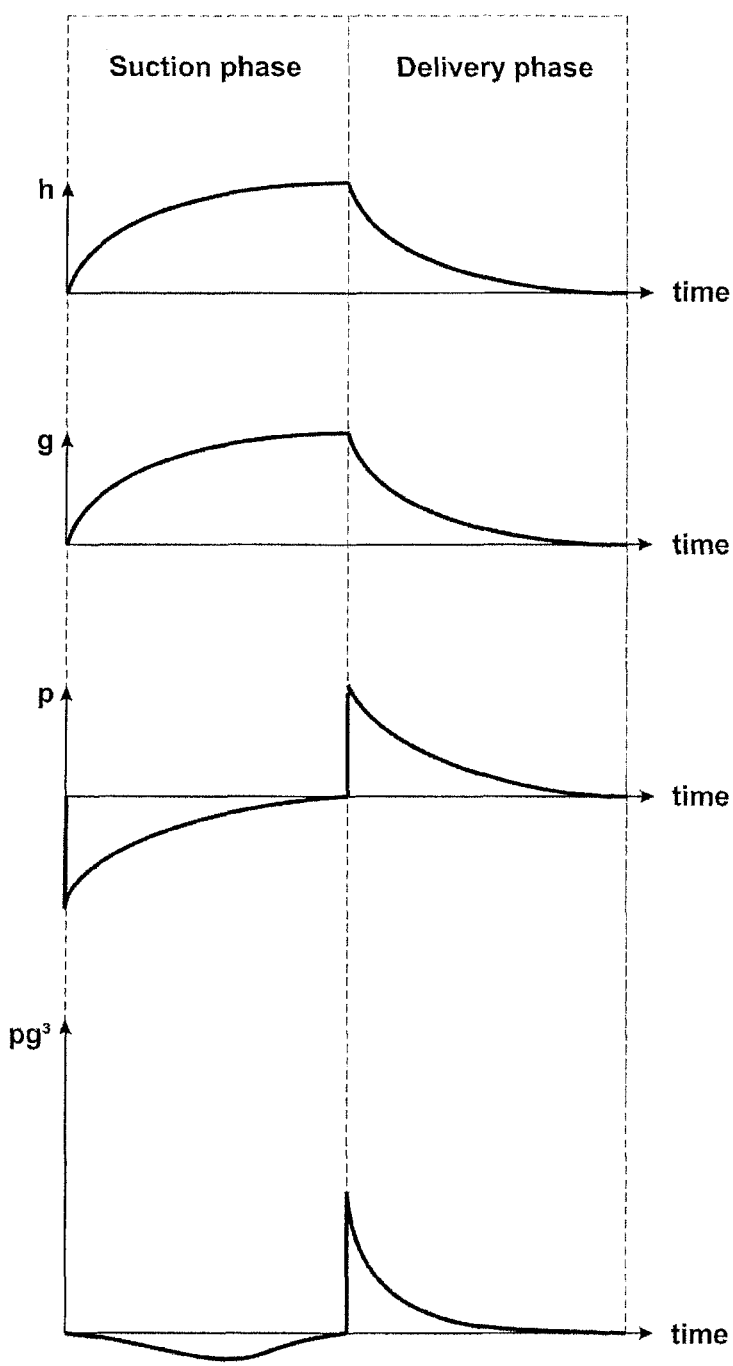
FIG. 6A is a series of graphs of the gap height, pump chamber pressure, and flow through the outlet for a pumping cycle for a pump according to the prior art without an elastic valve seat.

An explanation of the dynamic variation of the actuator stroke h, the gap width g, the pump chamber pressure p and the flow q2 through the outlet are shown in FIG. 6A for a single pump cycle of a pump with a rigid valve seat and valve boss as disclosed in publication [6] above. In the disclosure of publication [6], an under pressure is generated in the pump chamber during the suction phase and the gap height between the valve seat's sealing surface and the diaphragm g (which defines the fluidic resistance of this port) is increasing due to the upward moving of the pump diaphragm. Therefore, the gap height g starts from zero and reaches to its maximum value, while the underpressure starts at its maximum value and reaches to zero. During the delivery phase an overpressure is generated in the pump chamber and the gap height g is decreasing from its maximum value to zero, while the overpressure is in its maximum as well, and falls zero as well. As the product of the chamber pressure p and the gap height to the third power $g^3$, i.e. the factor $pg^3$, is a measure of the fluid flow through the outlet, a lower share of flow will enter the pump chamber through the outlet during the suction phase, and a higher share of flow is dispensed into the outlet during the delivery phase. As a result, a net fluid flow will be dispensed into the outlet through every pump cycle.

Figure 6B:
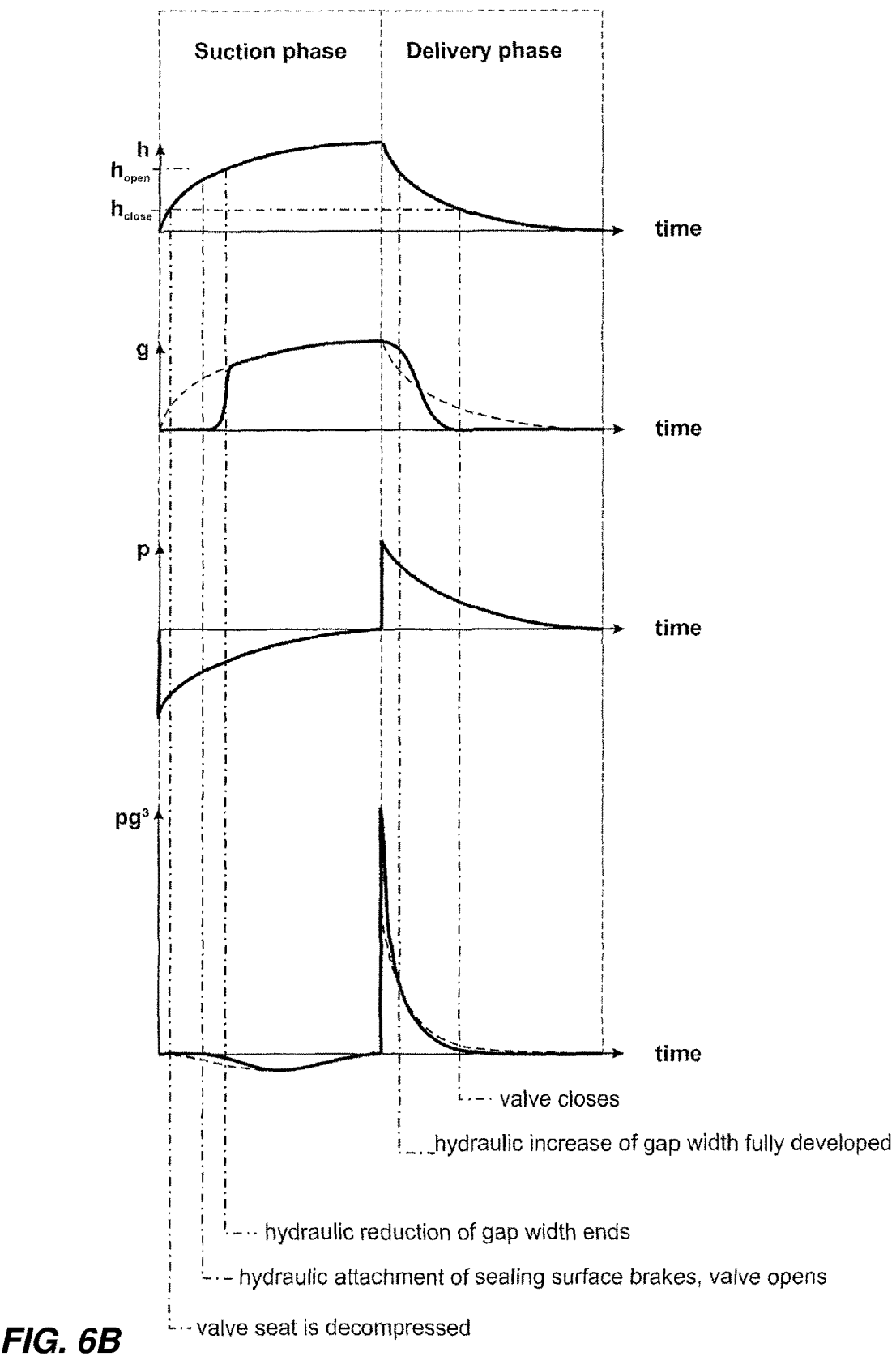
FIG. 6B is a series of graphs of the gap height, pump chamber pressure, and flow through the outlet for the pumping cycle of the pump shown in FIGS. 3A-3E.

The elastic valve seat 15 with hysteretic behavior in the pump 100 according to the invention amplifies this effect tremendously. As shown in FIG. 6B, during the suction phase shown in FIG. 3D, the valve seat 15 is still compressed and will expand first to its undeformed height. In this time period, a huge under pressure is generated in the pump chamber 12 with no effect on the flow through the outlet 14 into the pump chamber 12 which is zero due to the closed valve. After decompression, the valve seat 15 will adhere to the pump diaphragm 11 while this is moving upward. Therefore, the outlet 14 stays closed and the flow through the outlet 14 into the pump chamber 12 is still zero while the pressure in the pump chamber 12 decreases. After detachment of the valve seat 15 from the pump diaphragm 11, the remaining under pressure in the pump chamber 12 will generate a small flow between the valve seat's sealing surface 18 and the pump diaphragm 11. The sealing surface 18 and valve gasket can be tailored in such a way that they are still attracted to the diaphragm 11 via suction forces, resulting in a decreased valve gap $g_{de}$. As a further consequence, a further elongation of elastic valve seat 15 occurs as the diaphragm 11 moves further upwards and the valve gap stays smaller, as shown in FIG. 5B. This effect will increase the fluidic resistance of this port significantly and reduce undesired flow through this port entering the pump chamber 12. A time period is generated at the transition point between the opening and closing state of the valve, where the valve stays closed due to elastic compression and stretching of the valve seat 15. Therefore, the valve shows a hysteresis of the fluid flow with respect to the position of the pump diaphragm 11. Only after full opening of the valve 15 a significant backflow from the outlet 14 to the pump chamber 12 will occur. However, the displaced volume is much smaller when compared to a micro-pump with a rigid valve seat.

At the start of the delivery phase, a high overpressure is generated in the pump chamber 12 by the downward movement of the pump diaphragm 11. The elastic valve seat 15 can be designed in such a way that it is compressed and is moving downward with respect to the pump diaphragm 11, although the pump diaphragm 11 is not yet in contact with its sealing surface 18. As a result, the gap g between pump diaphragm 11 and sealing surface 18 is dynamically increased to a value $g_{in}$, as schematically shown in FIG. 5A. This will decrease the fluidic resistance of this port and increase the desired flow through this port exiting the pump chamber 12. In general, as the fluid flow through the outlet 14 is related to $pg^3$, an elastic valve seat 15 with a dynamically changing gap height increases or decreases the net flow during each pumping cycle with a cubic factor.

The pump diaphragm 11 and the pump body 16 can be made from any material suitable for a desired application and for the actuation mechanism in use, for example, metals, polymers, glass, ceramics, piezoceramics, ferromagnetic material, or silicon, alone or in combination. In the region where mechanical contact with the valve seat 15 occurs, the mechanical stiffness of the pump diaphragm 11 has to be significantly higher than the mechanical stiffness of the elastic valve seat 15. The valve seat 15, in an embodiment is made from an elastic material, for example, silicone, rubber or other elastomers. The shape of the pump diaphragm 11 can be tailored appropriate to the desired application and to the actuation mechanism in use, for example, as a square, octagon, circle or rectangle. In an embodiment, the pump diaphragm 11 has a much higher stiffness than the elastic body 16 of the valve seat 15, so that the elastic body 16 does not hinder the movement of the deflectable pump diaphragm 11 in a significant way.

Various embodiments of the elastic valve seat 15 are shown in FIGS. 7A-7H. The drawings show the cross-sections of a round, tubular body 16 in a side view. In an embodiment, the body 16 has a cylindrical shape. However, any shape of the tubular body 16 is conceivable if required, i.e. in a top or bottom view the valve seat 15 can also have a square, rectangular, or other shape.

Figure 7A:
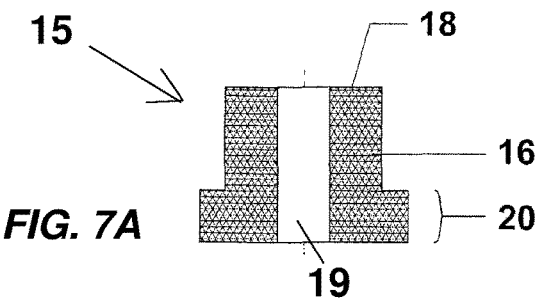
FIG. 7A is a sectional side view of an elastic valve seat according to an embodiment.

A valve seat body 16 according to an embodiment shown in FIG. 7A is made from an elastic material and has a planar sealing surface 18 on the top, facing the pump diaphragm 11 and a fluid channel 19 extending through the valve body 16 and the sealing surface 18. A base 20 of the seat body 16 can be made in a desired shape and geometry different from the rest of the valve seat 15. This is done to realize e.g. a mounting flange for the whole elastic seat. In an embodiment, the base 20 has a radial thickness larger than a radial thickness of a distal end of the body 16 that contacts the diaphragm 11.

Figure 7B:
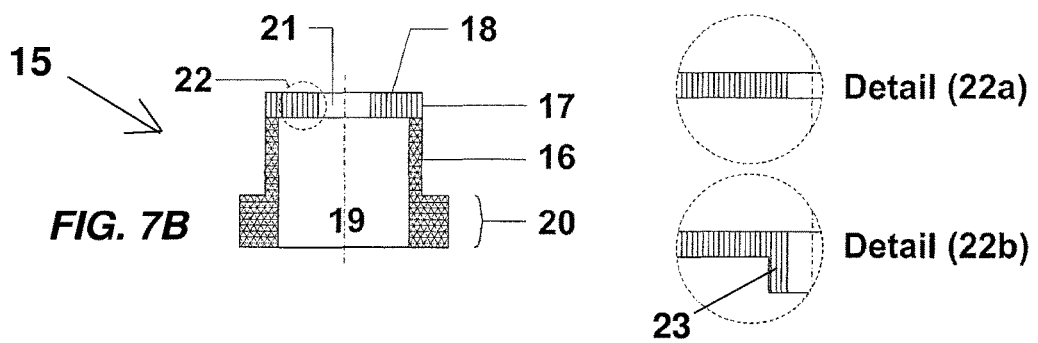
FIG. 7B is a sectional side view of an elastic valve seat according to another embodiment.
Figure 7C:
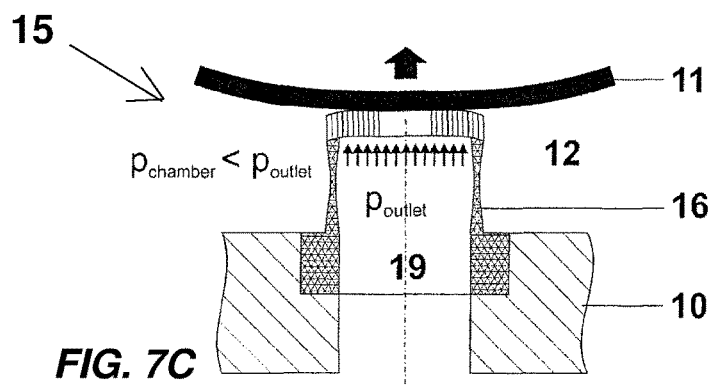
FIG. 7C is a sectional side view of the elastic valve seat of FIG. 7B in contact with a diaphragm of the pump.

In an embodiment shown in FIG. 7B, the elastic valve seat 15 has the valve seat body 16, a separate gasket 17, and a sealing surface 18 on top of the gasket 17, facing the pump diaphragm 11. In an embodiment, in order to choose optimal material characteristics for the sealing function on the one hand, and for the deformation of the valve seat 15 on the other hand, the elastic body 16 and the gasket 17 are fabricated as separate parts. In another embodiment, the valve seat 15 with these two components may also be fabricated as one integral part.

The channel 19 is made with a stepped cross section, i.e. its diameter is larger in the valve body 16 and smaller in the gasket 17. An orifice 21 is formed in the gasket 17 in such a way that the gasket 17 also forms an elastic circular lip 22 facing towards the channel axis. This lip 22 can be designed in a straight fashion, as shown in detail 22a, or can have an inner, thinned and prolonged wall 23 of the orifice 21, as shown in detail 22b. The channel 19 wall in the valve seat body 16 is made thinner, which allows for a higher elasticity of the same. In this embodiment, the pressure difference between the outlet 14 and the pump chamber 12 will press the gasket 17 and the sealing surface 18 against the pump diaphragm 11 during the start of the suction phase of the micropump, shown in FIGS. 7C and 3D. The tubular valve seat body 16, due to its thin wall, will elongate as the pump diaphragm 11 moves upwards and allows the gasket 17 to stay attached to the pump diaphragm 11 due to the mentioned under pressure.

Figure 7D:
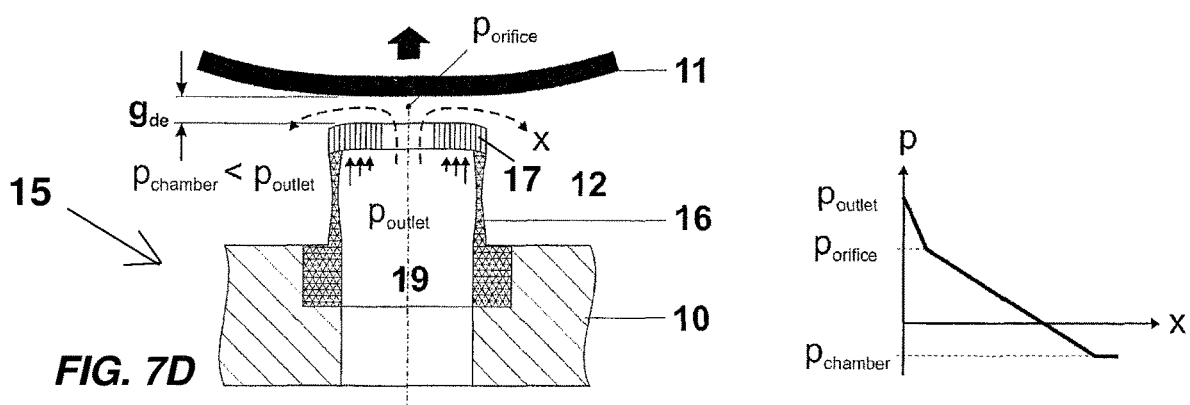
FIG. 7D is a sectional side view of the elastic valve seat of FIG. 7B at a release of the diaphragm from the elastic valve seat.

At higher deflection of the pump diaphragm 11, the valve seat surface 18 is detached from the pump diaphragm 11, as shown in FIGS. 5B and 7D. Now, a small lateral flow will be generated between the elastic valve gasket 17 and the pump diaphragm 11. This flow is accompanied by a pressure drop in the fluid channel 19 formed by the pump diaphragm 11 and the sealing surface 18 of the valve seat 15. Again, a pressure difference will arise across the valve gasket 17 and will press the elastic gasket 17 towards the pump diaphragm 11, generating a decreased gap width $g_{de}$, as explained above. The same effect will happen at the inner, thinned and prolonged wall 23 of the orifice 21, with the effect that the cross section and, hence, the flow through the orifice 21 is reduced.

Figure 7E:
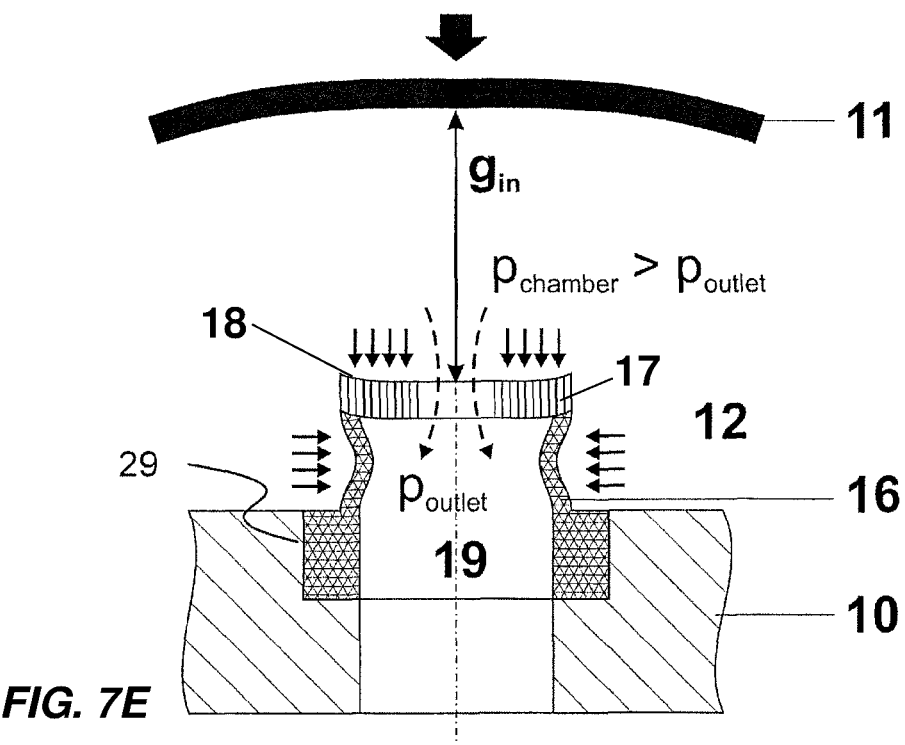
FIG. 7E is a sectional side view of the elastic valve seat of FIG. 7C after the release of the diaphragm from the elastic valve seat.

As a second effect, the thinner wall of the valve seat body 16 will allow for a downward movement of the valve gasket 17 and sealing surface 18 during the delivery phase of the micropump, as shown in FIGS. 3A, 3B, and 5A. In this phase, fluid is pumped through the elastic valve seat 15. Following known laws of hydrodynamics, a pressure drop occurs primarily across the narrower orifice 21 present in the valve seat gasket 17. Therefore, a lower pressure is present in the channel 19 section of the valve seat body 16 with respect to the pump chamber 12. As a consequence, the side walls of the valve body 16 will be laterally deformed inward and the valve gasket 17 and sealing surface 18 will be lowered, as shown in FIG. 7E. The results is an increased gap width $g_{in}$, as explained above. Further, if the pump diaphragm 11 comes close to the valve gasket 17, a local overpressure is generated in the small gap in between. This will also push the valve seat 15 downwards.

The valve design according to FIG. 7B has the slight disadvantage that during the suction phase, with under pressure in the pump chamber 12, the side walls of the valve body 16 will be deflected outwardly, i.e. away from the channel 19. The effect is not shown for reasons of clarity in FIG. 7C. Therefore, the valve gasket 17 will also be moved away from the pump diaphragm 11 in this case. This is a detrimental effect, as it will counteract the attraction of the valve gasket 17 to the pump diaphragm 11 as described above and in FIGS. 7D and 7E.

Figure 7F:
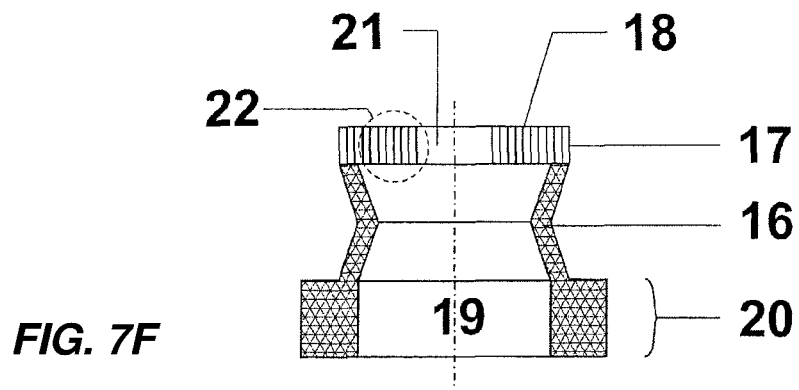
FIG. 7F is a sectional side view of an elastic valve seat according to another embodiment.

To solve this problem, if required, the valve embodiment in FIG. 7F has a valve body 16 with a single bellow, i.e. the walls are in a V-shape towards the channel 19. In another embodiment, the walls with the bellow may be in a U-shape towards the channel 19. During the suction phase, an under pressure in the pump chamber 12 with respect to the outlet pressure will also deflect the valve body 16 outwards, away from the channel 19. However, the inclined walls of the valve body 16 induce a vertical upward force at the gasket 17 and will raise it towards the pump diaphragm 11, which is desirable as it assists the effects described in FIGS. 7C and 7D. During the delivery phase the overpressure in the pump chamber 12 will again deflect the valve body 16 inwards, towards the channel 19, with the effects described in FIG. 7E.

Figure 7G:
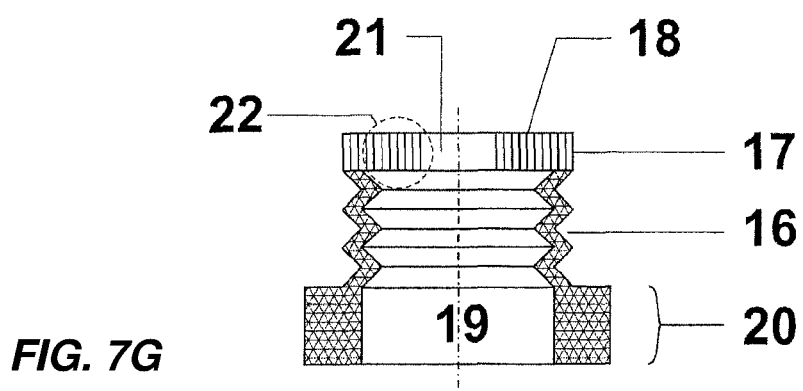
FIG. 7G is a sectional side view of an elastic valve seat according to another embodiment.

As shown in FIG. 7G, the shape of the valve seat body 16 can be further tailored in an appropriate way to allow for a vertical elongation. Here, the valve seat body 16 is made in form of a multiple of bellows that is elongated in a vertical direction. However, any other shape or form of the wall curvature is conceivable, e.g. a variable wall thickness, variable wall shape or a variable cross section of the channel 19. In an embodiment, the wall thickness of the valve seat 15 may change along its length in a stepped or continuous way.

Figure 7H:
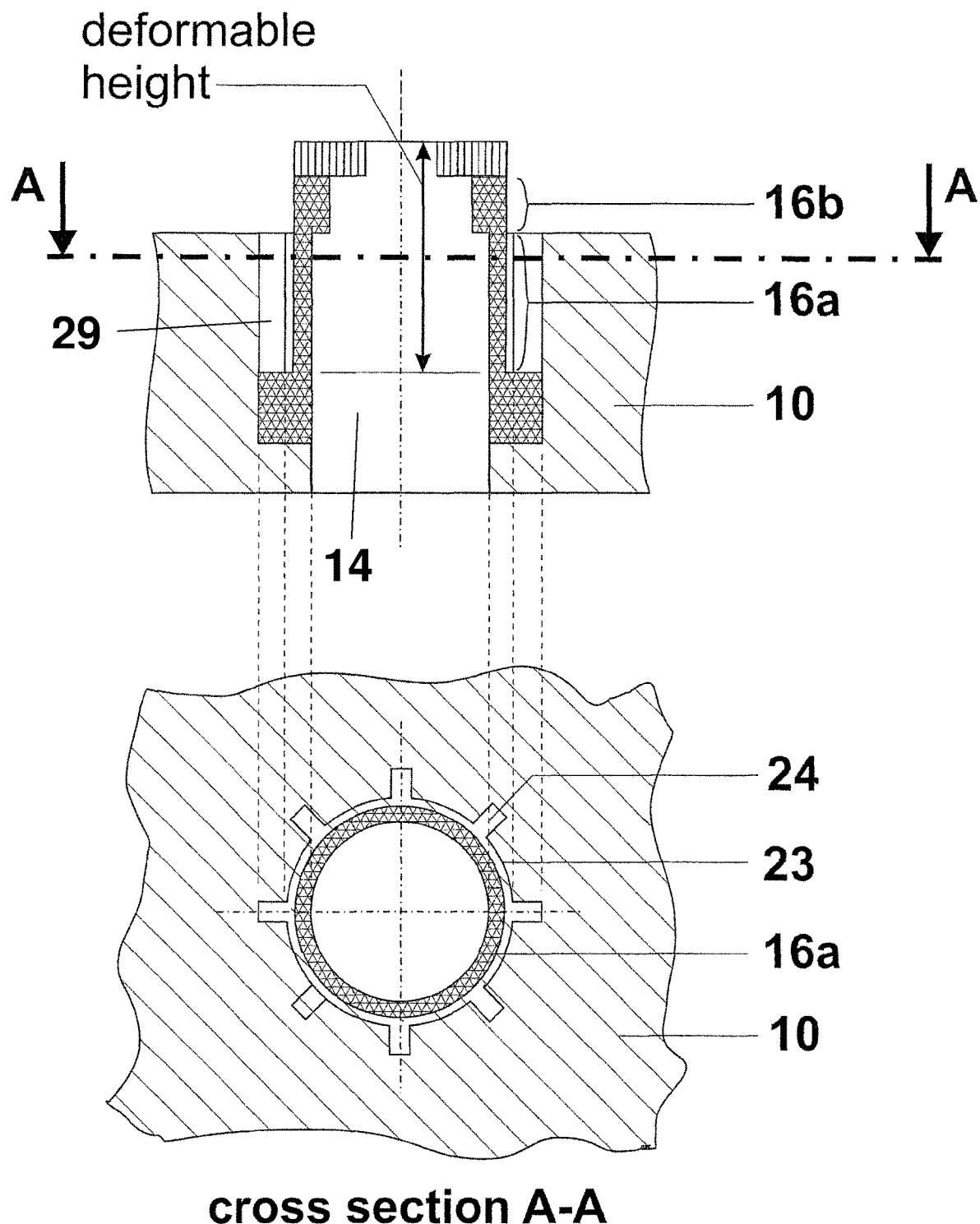
FIG. 7H is a sectional side and top view of an elastic valve seat according to another embodiment embedded in a pump body.

As shown in FIG. 7H, the elastic and deformable part of the valve body 16 can be embedded, at least in part, into a first recess 29 of the pump body 10 formed at the second opening 14 to achieve a larger deformable height of the same. The first recess 29 faces the pump chamber 12. This can also be used to prevent the undesirable outward deflection of the valve body 16 during the suction phase, as described above. For this purpose, the side wall of the pump body 10 cavity, facing the embedded part of the valve body 16, can be designed as a mechanical obstacle 23 that prevents the valve body 16 from an outward deflection. Fluidic channels 24 are provided in the obstacle 23 alongside the valve body 16 for pressure equilibration. The valve body 16 itself is divided into two segments, with segment 16b having a larger wall thickness than segment 16a; segment 16a has a reduced wall thickness. Therefore, elongation and compression will happen in segment 16a, and an unwanted outward deflection of segment 16a is prevented.

Figure 8:
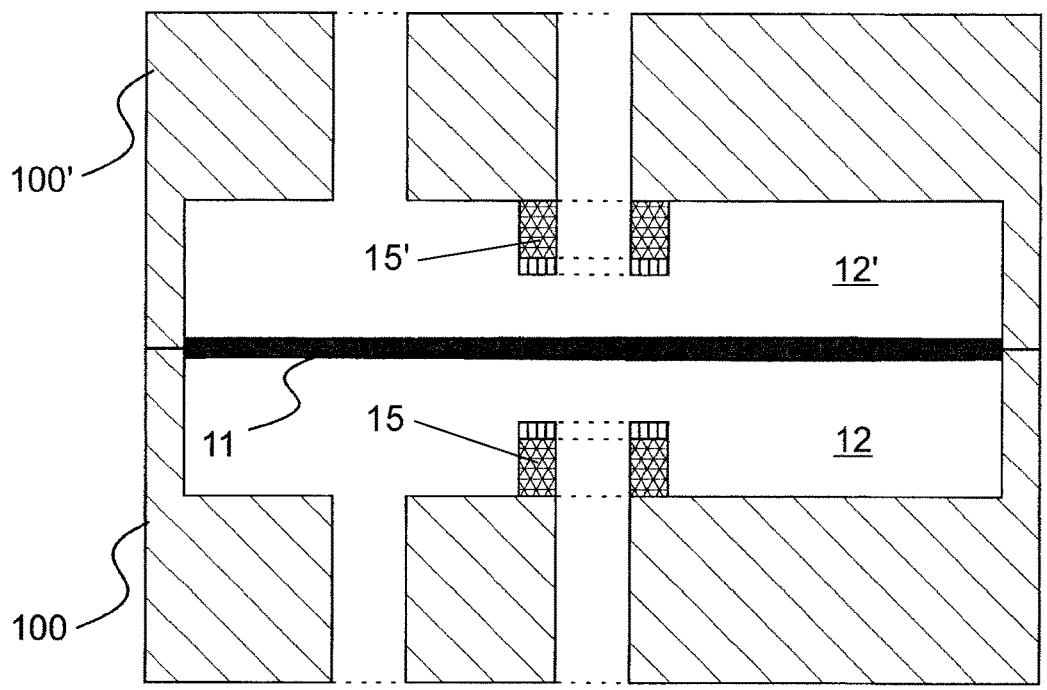
FIG. 8 is a sectional side view of a fluid pump system according to an embodiment.

A fluid pump system according to an embodiment having a pair of parallel micropumps 100, 100' is shown in FIG. 8. The same pump diaphragm 11 is used to drive two valve seats 15, 15' placed onto both sides of the diaphragm 10 in an alternating way.

Figure 9:
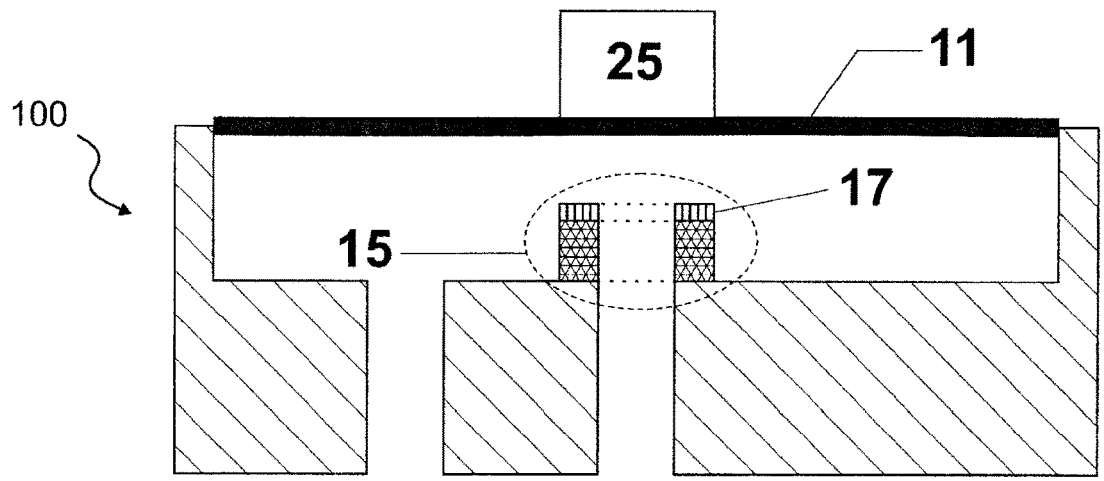
FIG. 9 is a sectional side view of a fluid pump according to another embodiment.
Figure 10:
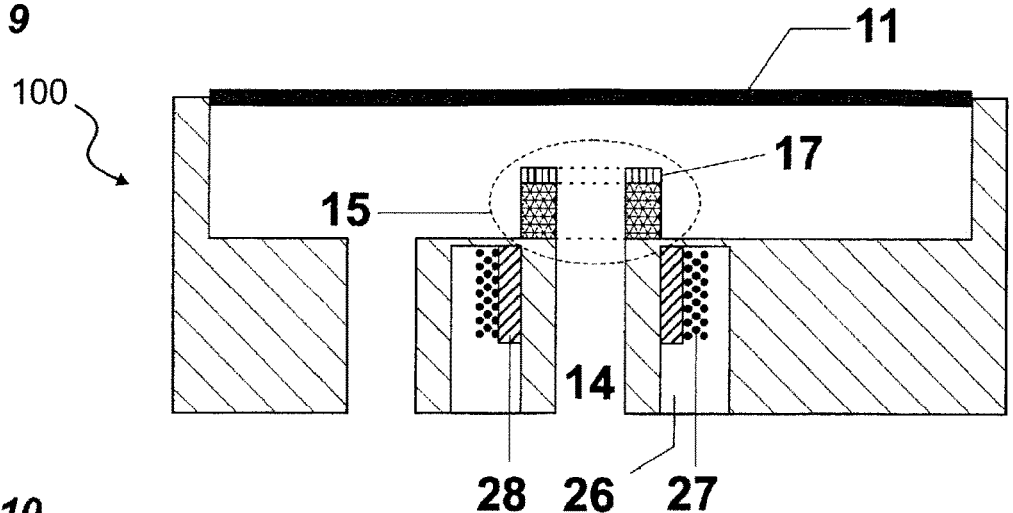
FIG. 10 is a sectional side view of a fluid pump according to another embodiment.

A micropump 100 according to another embodiment is shown in FIG. 9. The embodiment of FIG. 9 can also be used, with minor modifications, for each micropump 100, 100' in FIG. 8. The gasket 17 in the embodiment of FIG. 9 is made magnetic, e.g. by using magnetic materials, layers from magnetic material on other materials, or by embedding magnetic particles or layers into a gasket 17 made from another material. The gasket 17 can be magnetized in form of a permanent magnet or can be made as a soft magnet. On top of the pump diaphragm 11, an electromagnetic actuator 25 is mounted. The electromagnetic actuator 25 may be an electromagnet made from a coil and a ferrite core facing the valve seat 15. As known from usual electromagnets, the valve gasket 17 can be attracted towards the magnetic actuator 25 if the gasket 17 has soft magnetic properties. It can also be attracted or repelled by the magnetic actuator 25, if it has permanent magnetic properties, by changing the direction of current in a coil of the actuator 25 and, hence, the direction of the magnetic field emitted by the actuator 25. In another embodiment shown in FIG. 10, the magnetic actuator 25 is integrated into a circular or ring-shaped recess 26 arranged concentrically around the second opening 14 in the pump body 10, for example, as a coil 27 with a ferrite core 28 surrounding the outlet 14 below the elastic valve seat 15.

For micropump operation, the magnetic actuator 25 is turned on and turned off synchronous to the diaphragm 11 movement as required. As an effect, the gap height g and the hysteretic effect of the elastic valve 15 can be improved and/or adjusted with another degree of freedom. Also, a dynamic change of the gap height is possible by an according dynamic change of the current flow through the magnetic actuator 25. Also, the magnetic actuator 25 can be used to increase the performance of the valve 15 function, e.g. by closing the valve 15 both with a downward movement of the pump diaphragm 11 and with an activation of the actuator 25. Finally, the magnetic actuator 25 can be used to regulate the flow rate of the micropump, by adjusting the gap height g under operation in a required way.

The micropump 100 according to the embodiments described above uses only a single actuated membrane, the diaphragm 11, for providing a unidirectional flow between an inlet 13 and an outlet 14. The same device can employ an active valve function, with actuated on and off conditions as well as with a preferential normally-on or normally-off function. Within the presented invention, utilizing a flexible seat member in a simple structure, two physical effects are created, which together create a pumping effect. Within the first aspect, the flexible seat or diaphragm 11 opens and closes the fluidic port in different positions, in a hysteretic manner. In the second aspect, a dynamic change in resistances is amplified by the design and deformation of the flexible valve seat 15. The application of this pump 100 can be in various areas of science and technology such as and not limited to micro-total-analysis-systems, lab-on-a-chip applications, cooling of electronic devices, injection systems, dosing and metering setups and others.

Figure 11:
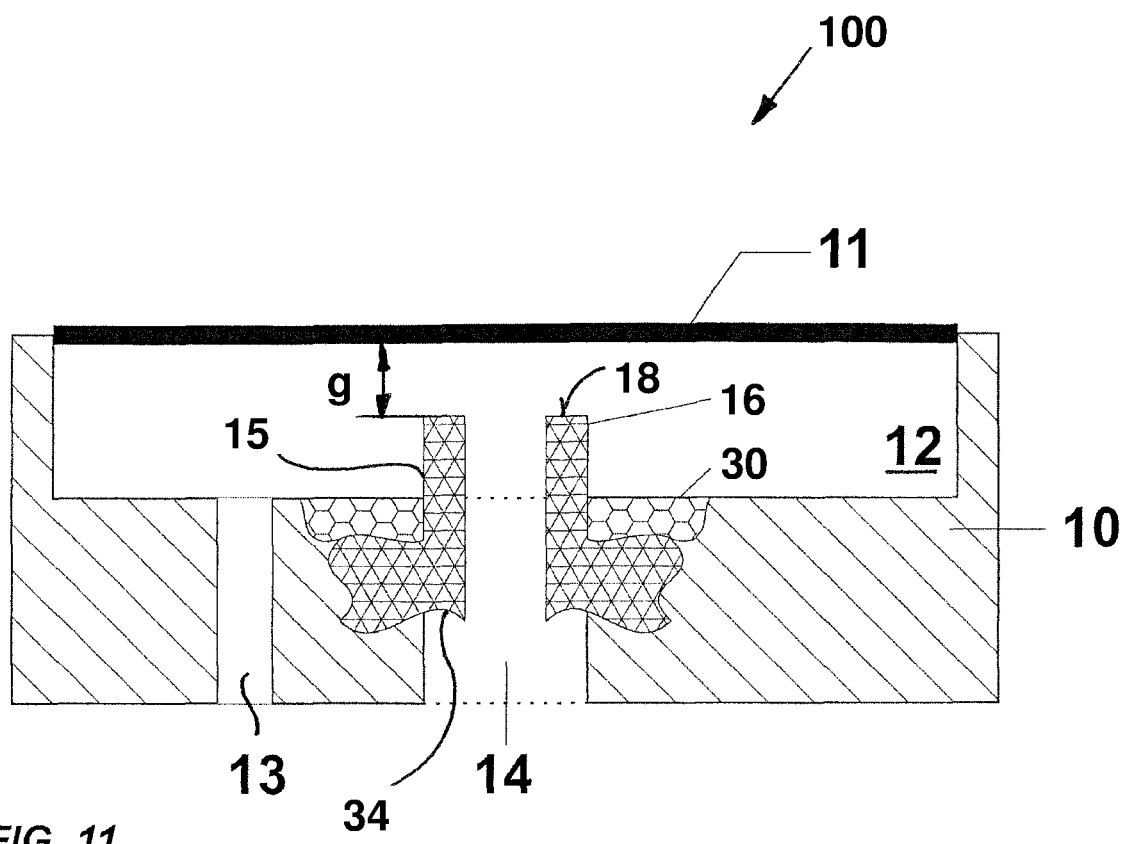
FIG. 11 is a sectional side view of a fluid pump according to another embodiment in a first operational state.
Figure 12:
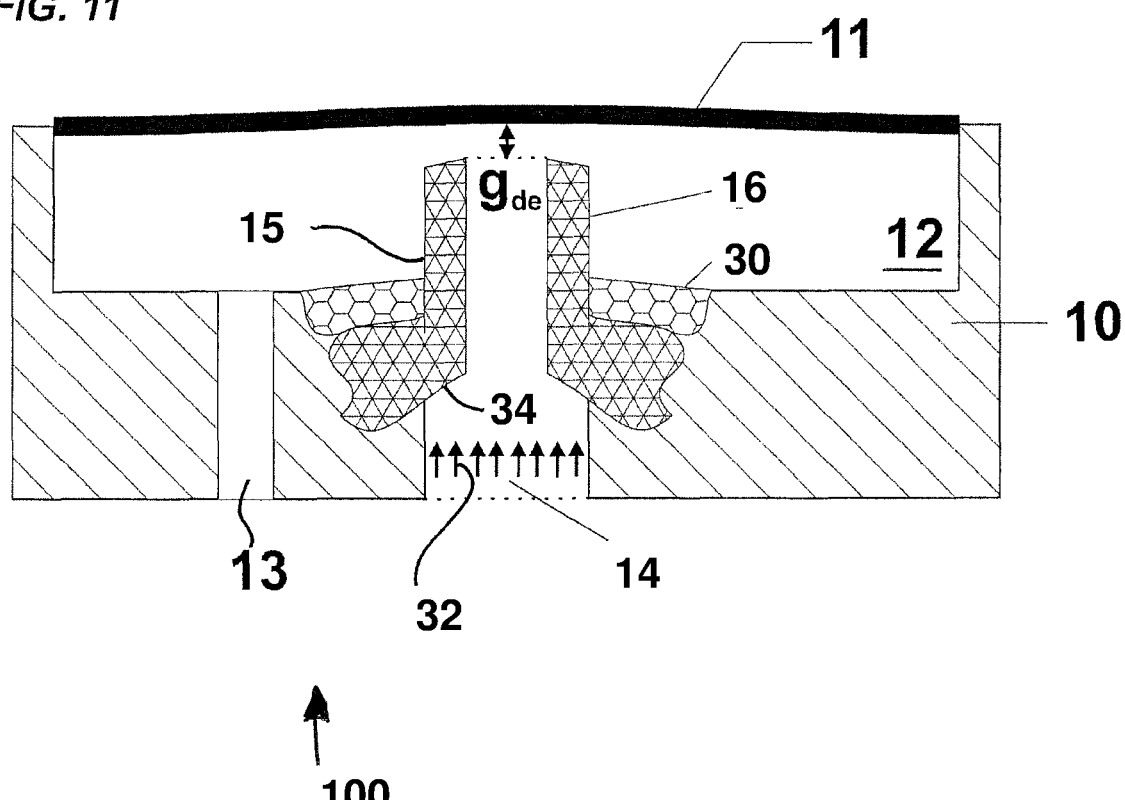
FIG. 12 is a sectional side view of the fluid pump of FIG. 11 in a second operational state.

A micropump 100 according to another embodiment is shown in FIGS. 11 and 12. The micropump 100 is shown in a first operational state in FIG. 11 and a second operational state in FIG. 12. In the first operational state shown in FIG. 11, no pressure differences act on the valve seat 15, or on the diaphragm 11. In this embodiment, a movable valve mechanism improves the valving functionality of valves and microvalves. Although the Figures depict the valve in the application environment of a micropump 100, it is clear for a person skilled in the art that the valve described herein with a valve seat that moves under the actuation of a backpressure can be used with any other suitable fluid flow control arrangement as well.

As shown in FIGS. 11 and 12, the valve seat 15 can move, comparable to the diaphragm 11 (also referred to as a membrane), under a pressure 32 that is applied at the opening 14 of the valve. Thereby, the valving functionality between the first opening 13 and the second opening 14 is improved and amplified. Under an applied pressure 32, the gap between the diaphragm 11 and the elastic body 16 of the valve seat 15 decreases from g to $g_{de}$. In other words, the valve seat's sealing surface 18 moves closer in a direction from the pump body 10 towards the diaphragm 11.

This movability can be simply due to the use of a flexible valve seat 15 material which can elongate because of the underpressure created in the narrow region between the diaphragm 11 and the valve seat 15 due to the Bernoulli effect, or can be due to the use of a flexible valve seat 15 installed in a way that can deform/deflect under the applied pressure 32, for example by having a surface area exposed to the applied pressure 32. As shown in FIGS. 11 and 12, the elastic body 16 of the valve seat 15 has at least one actuation region 34 adapted to be actuated by the applied fluidic pressure 32 directed from the opening 14 towards the pump chamber 12. In addition, the movability can be due to the use of a valve holder 30 which can deform/deflect under the applied pressure 32, or it can be due to the use of a flexible embodiment of valve seat 15 in general which can deform/deflect under the applied pressure, or a combination of all. The valve seats 15 shown in FIGS. 7B-7H comprise an actuation area that is formed by the elastic circular lip 22 facing towards the channel axis.

Due to the presence of the actuation area 34 (and 22), with applying higher pressures on the valve, the gap between the valve seat 15 and diaphragm 11 of the valve will decrease, which consequently simplifies the closure. With correct correlation between the applied pressure and the resultant variable gap, one may even realize a passive self-controlling-pressure/flow device. The application of this invention can be in various areas of science and technology such as and not limited to micro-total-analysis-systems, lab-on-a-chip applications, cooling of electronic devices, injection systems, dosing and metering setups and others. The geometrical and material properties of the valve seat 15, valve holder 30, and valve embodiment are control variables to achieve the desirable pressure-deflection or pressure-gap profiles.

Experimental results of the valve arrangement shown in FIGS. 11 and 12 will now be explained. In the following, the achieved experimental results of the valve operation under 2 bar (200 kPa) of pressure with air as well as water as our liquids are provided. The deflection (in µm) of the valve seat under various pressures is provided for both cases. The analyzed valves are suitable for handling (opening and closing) pressure range of 0-2 bar. For more than 2 bar, the valve deflection is more than what membrane deflection can handle, i.e. the valve cannot open, and stays closed.

Figure 13:
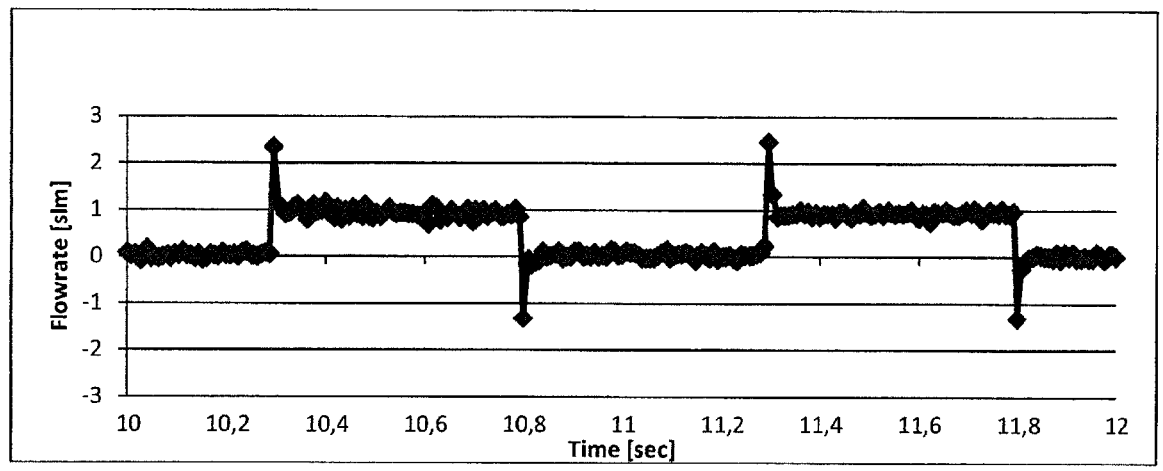
FIG. 13 is a graph of an operation of a valve of the fluid pump of FIG. 11 for air as working fluid against 2 bar at 1 Hz.
Figure 14:
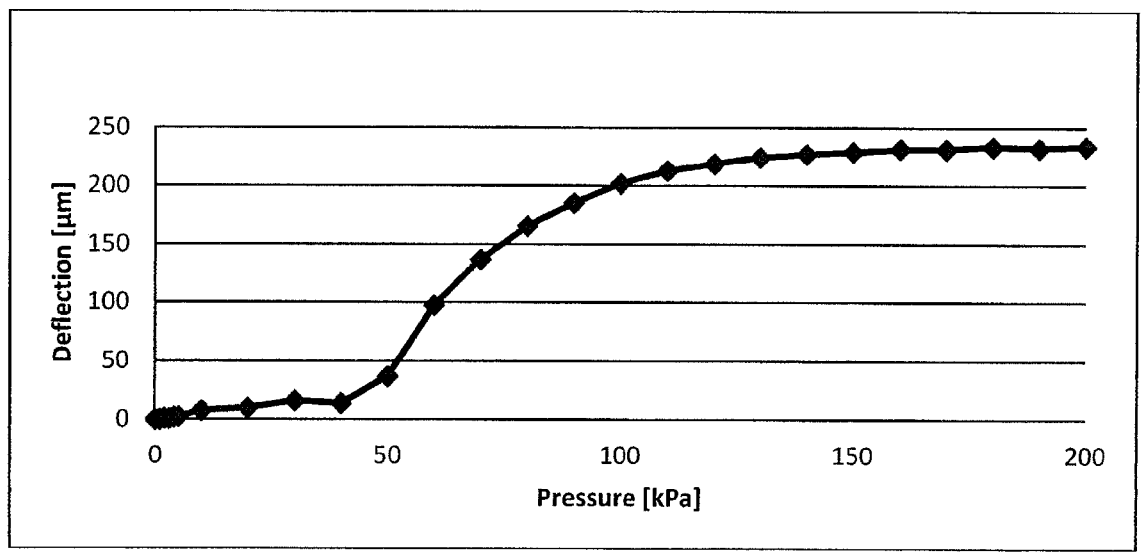
FIG. 14 is a graph of a deflection of a valve seat of the valve of the fluid pump of FIG. 11 against pressure for air as the working fluid.
Figure 15:
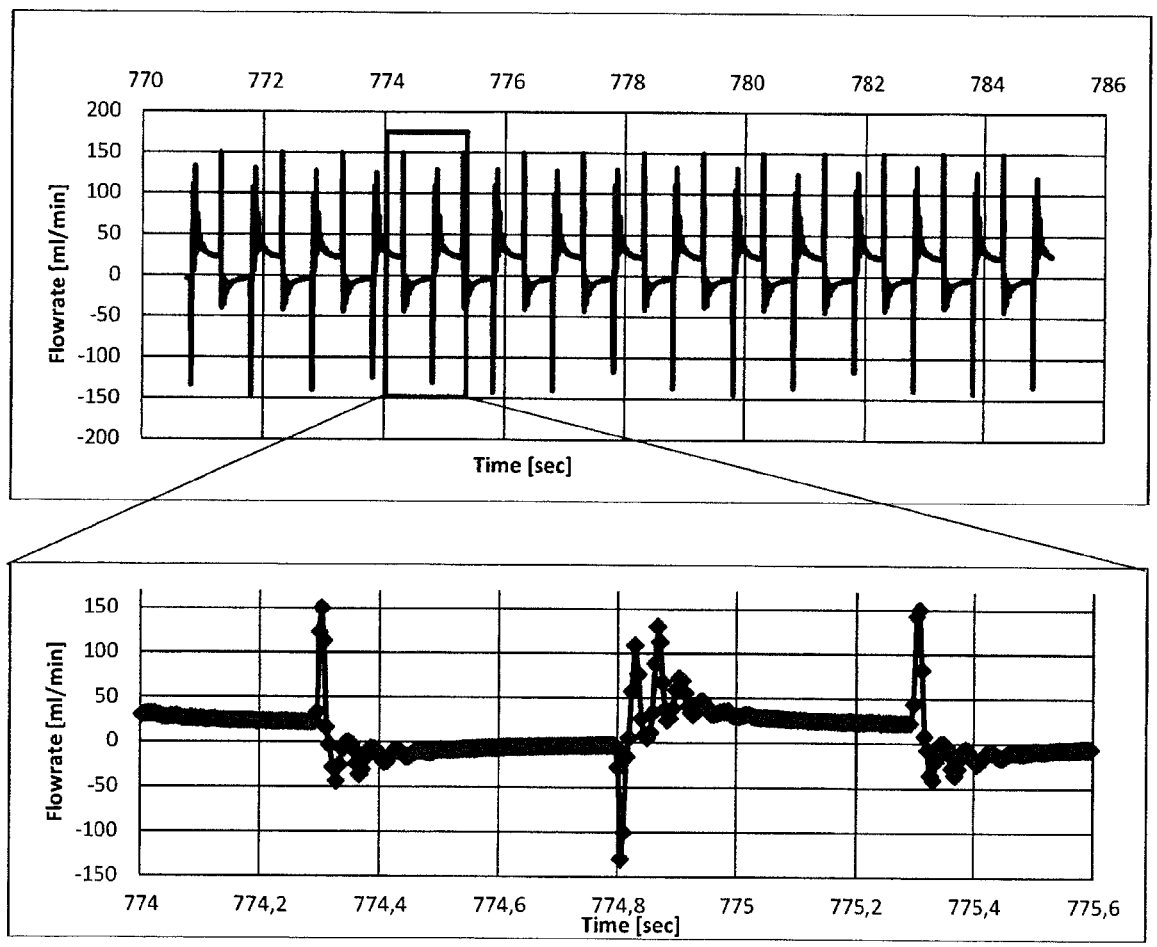
FIG. 15 is a graph of an operation of the valve of the fluid pump of FIG. 11 for water as working fluid against 2 bar at 1 Hz.
Figure 16:
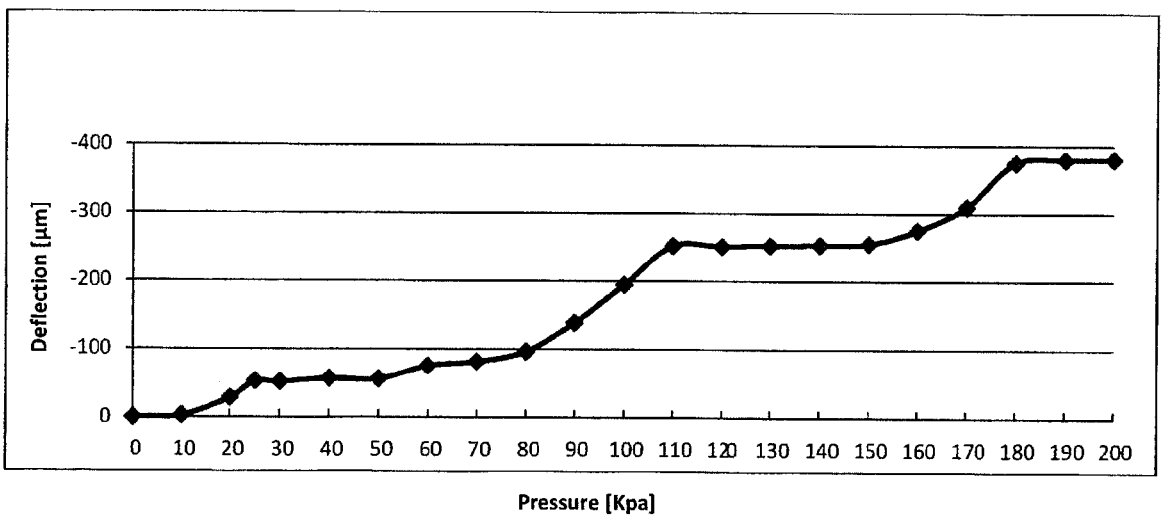
FIG. 16 is a graph of the deflection of the valve seat of the valve of the fluid pump of FIG. 11 against pressure for water as the working fluid.

FIGS. 13 and 14 accordingly illustrate the valve operation for air as working fluid against 2 bar at 1 Hz and the valve seat 15 deflection against pressure for air as working fluid, respectively. Furthermore, FIGS. 15 and 16 illustrate the valve operation for water as working fluid against 2 bar at 1 Hz and the valve seat 15 deflection against pressure for water as working fluid, respectively. The deflection of the valve seat 15 under pressure when working with water is more than when working with air (for example the deflection for air is around 234 µm under 200 kPa, but for water is around 380 µm). This is due to the extra underpressure created in the narrow region between the membrane 11 and the valve seat 15, in the case of water. The under pressure comes from the Bernoulli effect, and is negligible for air as the density of the air is negligible.

Figure 17:
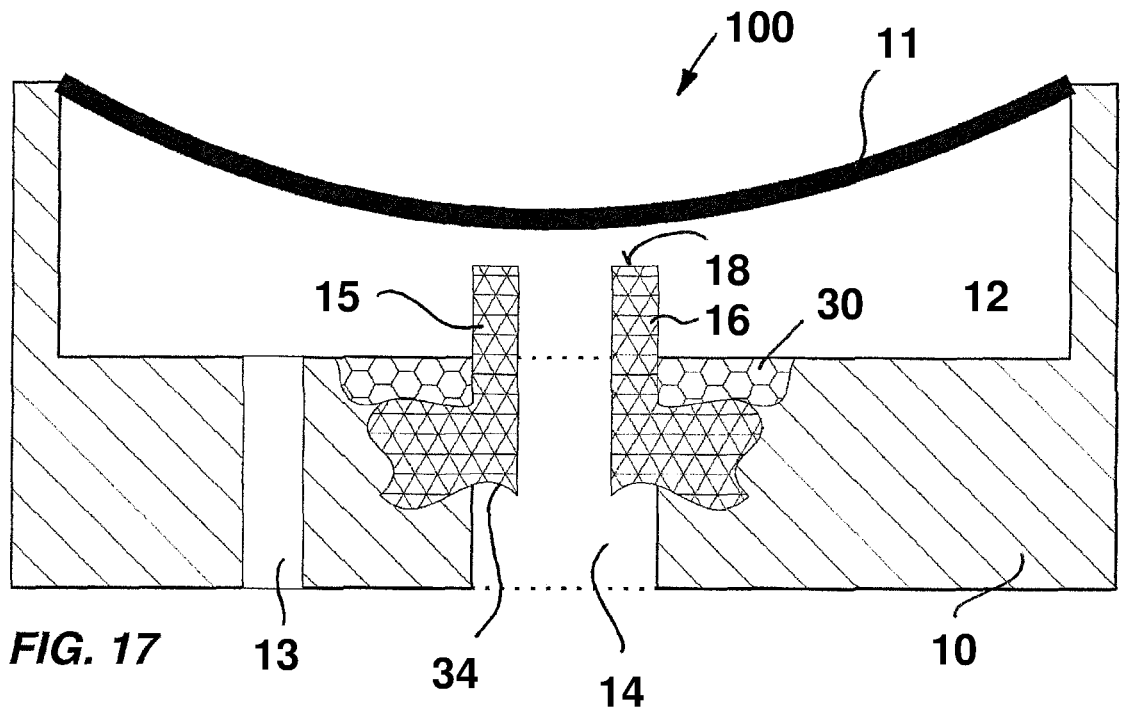
FIG. 17 is a sectional side view of a fluid pump according to another embodiment.

Considering the initial gap g between the membrane 11 and the valve seat 15, the maximum deflection of the membrane 11 and the maximum deflection of the valve seat 15 under the pressure (which is a function of the geometry and material properties of the valve seat 15, the valve holder 30, and the valve's design), the working rage of the valve 100 can be tuned. That is, the pressure operational window of the valve 100 can be shifted to higher pressures, as an example to 1 bar to 3 bar, which means that the valve would require a minimum pressure to operate, in this example 1 bar. This can be achieved by using a relatively stiffer material or using a stiffer geometry for the valve seat 15, valve holder 30 or valve embodiment. The same effect can be achieved for example by adjusting an initially larger gap g between the membrane 11 and the valve seat 15. Thus, even with the maximum deflection of the membrane 11 the valve still remains open as shown in FIG. 17.

Figure 18:
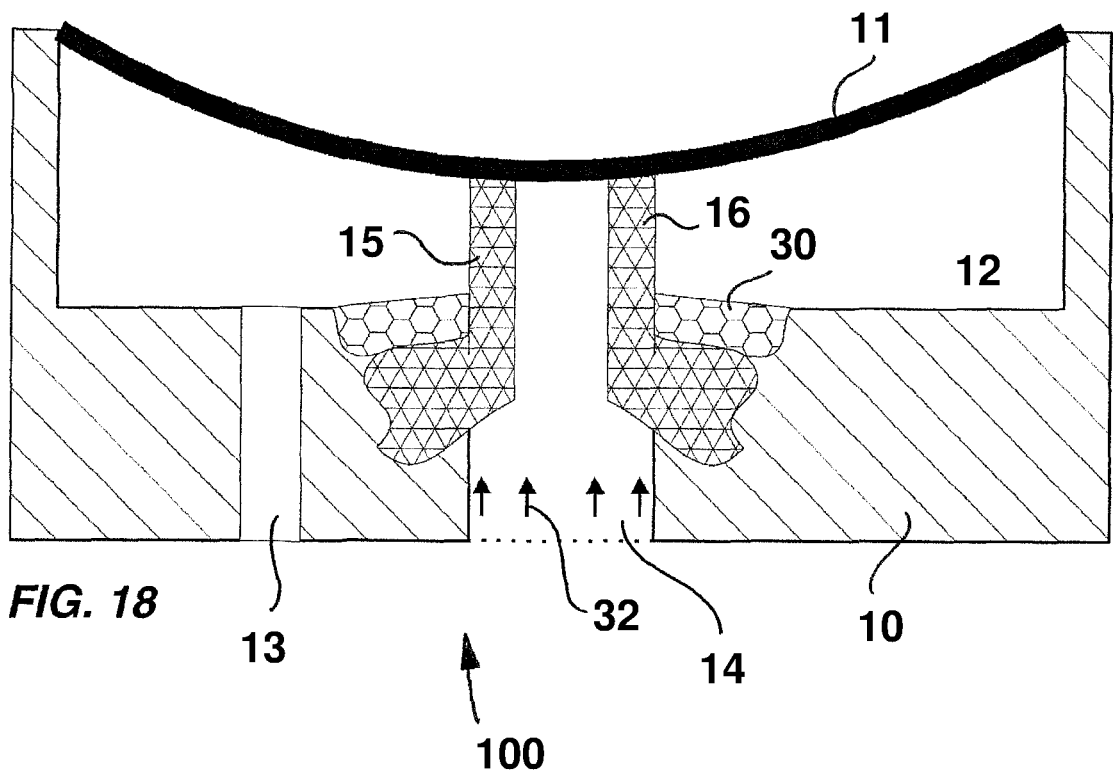
FIG. 18 is a sectional side view of the fluid pump of FIG. 17 with a diaphragm in contact with a valve seat.

The valve 100 requires a minimum pressure 32, in which the valve seat 15 deflects enough to reach to the operating range of the membrane 11, so that with the membrane's activation, the remaining gap can be closed as shown in FIG. 18. Thus, a valve with shifted operational pressure window is achieved with the advantage of being able to close against higher pressures, however, with the disadvantage that it requires a minimum pressure to be able to close.

Figure 19:
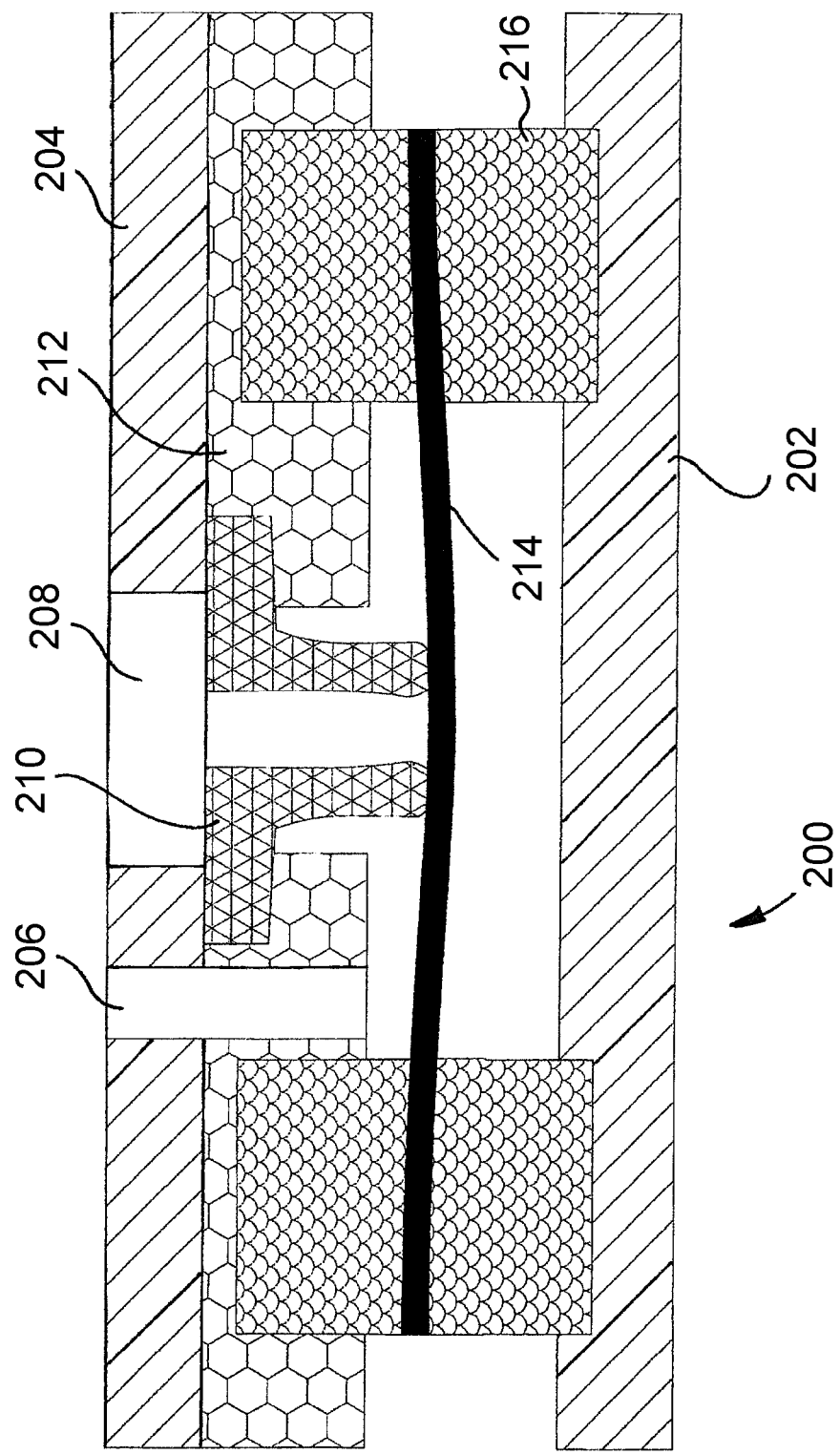
FIG. 19 is a sectional side view of a valve according to another embodiment in a first operational state.

FIG. 19 shows another configuration of the valve to realize an initially compressed valve seat, which assures a normally-closed valve configuration. The valve 200 comprises a bottom plate 202 and a connection plate 204. The connection plate 204 has a first opening 206 and a second opening 208. An elastic valve seat 210 is arranged at the second opening 208 and is fixed by a flexible valve holder 212. A diaphragm 214 (also called membrane in the following) serves for actuation of the valve 200. For instance, a piezoelectric actuator may be arranged on the diaphragm 214 for changing its position. Alternatively, also radially applied forces may be applied which cause the membrane 214 to buckle. Sealing fixing devices 216 seal the diaphragm 214 against the bottom plate 202 and the connection plate 204.

Figure 20:
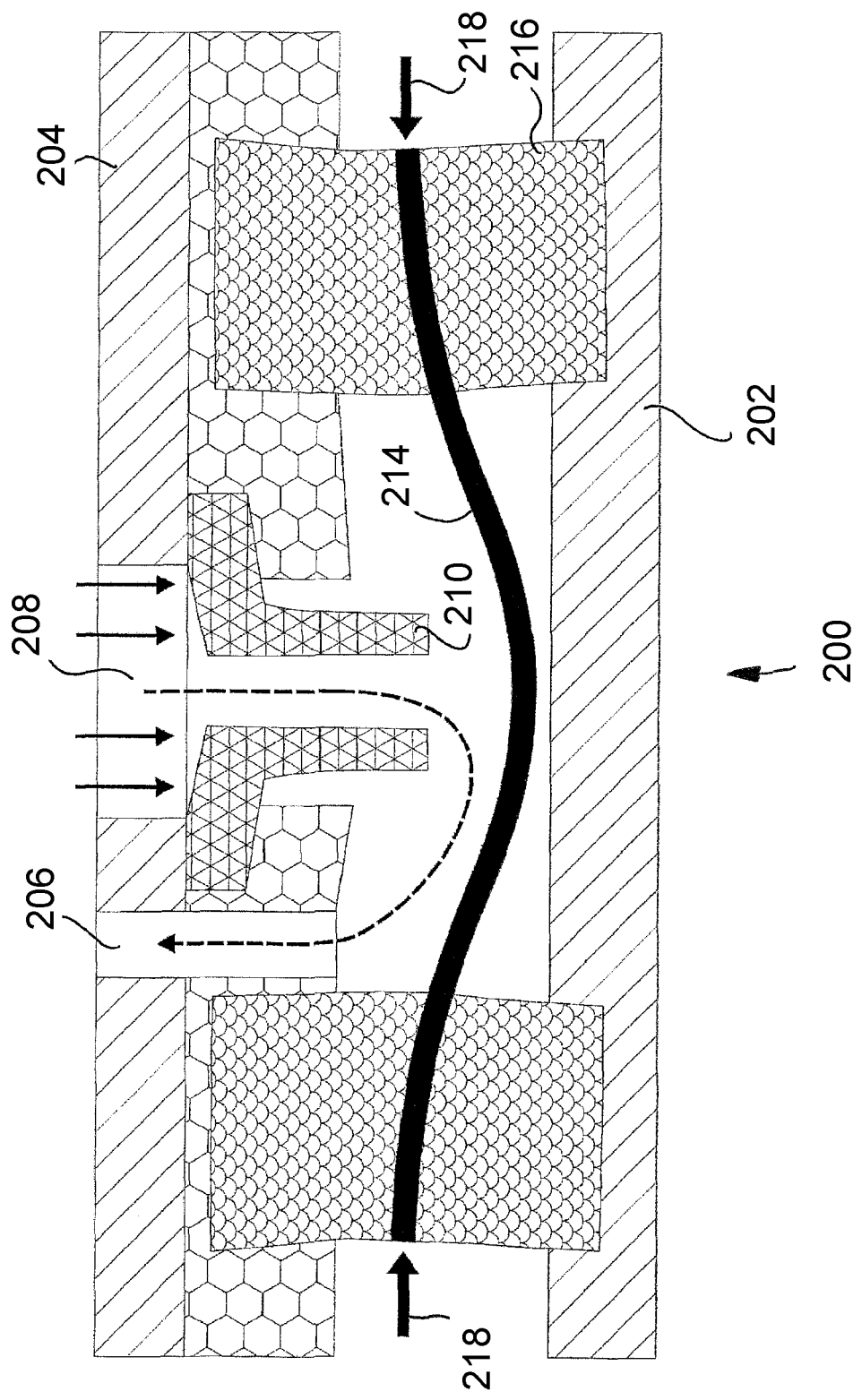
FIG. 20 is a sectional side view of the valve of FIG. 19 in a second operational state.

With an actuation as shown in FIG. 20, the valve 200 can be opened. The actuation according to the present embodiment comprises buckling of the diaphragm 214 due to a radial force 218, for instance an applied pressure. As can be seen from FIG. 20, the fixing device 216 is elastic and deflects under the radial force 218. The deflection of the valve seat 210 under applied pressure results in the same advantageous effect of a reduced gap and therefore is beneficial to close the valve 200.

Figure 21:
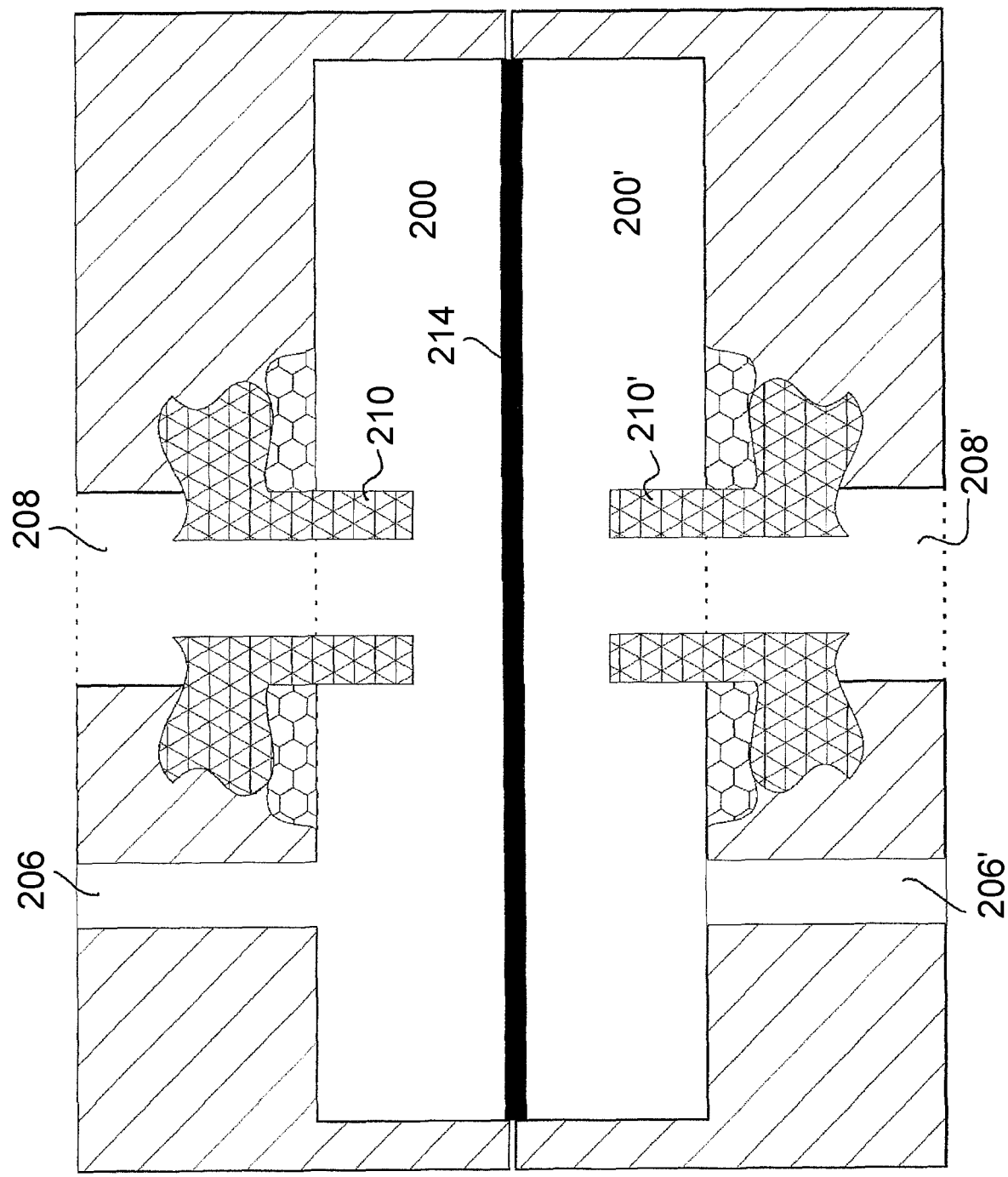
FIG. 21 is a sectional side view of a valve assembly according to another embodiment.

A valve assembly according to another embodiment is shown in FIG. 21. The diaphragm 214 is sandwiched between two valves 200, 200' in order to form a so-called ⅔ way valve.

What is claimed is:

1. A fluid pump for pumping a fluid from an inlet toward an outlet, comprising:
a pump body having a first opening and a second opening;
a pump diaphragm attached to the pump body and forming a pump chamber between the pump body and the pump diaphragm, the pump chamber is fluidly connected to the inlet by the first opening and to the outlet by the second opening; and
a valve seat disposed inside the pump chamber and around the second opening, the valve seat protruding with an undeformed height from the second opening into the pump chamber in a direction toward the pump diaphragm, the valve seat having an elastic body and a gasket with a sealing surface, the pump diaphragm is deflectable and is adapted to open and close a fluidic pathway of the outlet by moving into and out of contact with the valve seat, the elastic body is stretchable and has a height that is increased when the pump diaphragm is deflected away from the pump body from a state in which the pump diaphragm is separated from the valve seat.

2. The fluid pump of claim 1, wherein the pump diaphragm has a stiffness that is higher than a stiffness of the elastic body and the elastic body does not hinder a movement of the pump diaphragm.

3. The fluid pump of claim 1, wherein the elastic body has an elasticity and the height of the elastic body is reduced by compression when the pump diaphragm is deflected toward the pump body.

4. The fluid pump of claim 1, wherein the elastic body has a cylindrical shape arranged around the second opening.

5. The fluid pump of claim 4, wherein the elastic body has a mounting flange attached to the pump body around the second opening, the mounting flange has a larger radial thickness than a radial thickness of a distal end of the elastic body that contacts the pump diaphragm.

6. The fluid pump of claim 1, wherein the elastic body and the gasket are separate parts.

7. The fluid pump of claim 1, wherein the sealing surface is arranged to contact the pump diaphragm and a base attached to the pump body, the sealing surface has an orifice with a smaller diameter than a channel extending from the base through the valve seat and toward the orifice.

8. The fluid pump of claim 1, wherein the valve seat has a region with a reduced wall thickness.

9. The fluid pump of claim 1, wherein the valve seat has a bellow with a U-shaped or V-shaped profile.

10. The fluid pump of claim 1, wherein the valve seat is mounted at least partly within a first recess formed at the second opening and facing the pump chamber.

11. The fluid pump of claim 1, wherein the second opening is concentric with the pump diaphragm.

12. The fluid pump of claim 1, further comprising an electromagnetic actuator, the gasket has a magnetic material the electromagnetic actuator is adapted to elongate and/or compress the elastic body by interacting with the magnetic material.

13. The fluid pump of claim 12, wherein the pump body has a ring-shaped second recess arranged concentrically around the second opening, the electromagnetic actuator is mounted in the ring-shaped second recess.

14. The fluid pump of claim 1, wherein the valve seat has an actuation region adapted to be actuated by an applied fluidic pressure directed from the second opening toward the pump chamber.

15. The fluid pump of claim 1, wherein the valve seat has an elastic valve holder attaching the valve seat to the pump body.

16. A fluid pump system, comprising:
a pump diaphragm;
a first fluid pump including a first pump body and a first valve seat, the pump diaphragm attached to the first pump body and forming a first pump chamber between the first pump body and the pump diaphragm, the first valve seat disposed inside the first pump chamber and protruding with an undeformed height into the first pump chamber in a direction toward the pump diaphragm; and
a second fluid pump including a second pump body and a second valve seat, the pump diaphragm attached to the second pump body and forming a second pump chamber between the second pump body and the pump diaphragm, the second valve seat disposed inside the second pump chamber and protruding with an undeformed height into the second pump chamber in a direction toward the pump diaphragm, the first pump chamber and the second pump chamber are separated by the pump diaphragm, the pump diaphragm is deflectable and is adapted to open and close a fluidic pathway of an outlet of the first fluid pump by moving into and out of contact with the first valve seat and adapted to open and close a fluidic pathway of an outlet of the second fluid pump by moving into and out of contact with the second valve seat, each of the first and second valve seats having an elastic body and a gasket with a sealing surface, each elastic body is stretchable and has a height that is increased when the pump diaphragm is deflected away from the pump body from a state in which the pump diaphragm is separated from each of the first and second valve seats.

17. A method of operating a fluid pump, comprising:
providing the fluid pump including a pump body having a first opening and a second opening, a pump diaphragm attached to the pump body and forming a pump chamber between the pump body and the pump diaphragm, the pump chamber is fluidly connected to the inlet by the first opening and to the outlet by the second opening, and a valve seat disposed inside the pump chamber and around the second opening, the valve seat protruding with an undeformed height from the second opening into the pump chamber in a direction toward the pump diaphragm, the valve seat having an elastic body and a gasket with a sealing surface, the pump diaphragm is deflectable and is adapted to open and close a fluidic pathway of the outlet by moving into and out of contact with the valve seat, the elastic body is stretchable and has a height that is increased when the pump diaphragm is deflected away from the pump body from a state in which the pump diaphragm is separated from the valve seat;
actuating the diaphragm to move towards the valve seat until it comes into sealing contact with the gasket, and further actuating the diaphragm to move until the valve seat is compressed so as to have a reduced height compared to the undeformed height;
actuating the diaphragm to move away from the valve seat until the deflectable diaphragm loses contact with the gasket, and during this movement, the elastic body of the valve seat is stretched so as to have the increased height compared to the undeformed height; and
repeating the actuating steps to pump a fluid from the inlet toward the outlet.

18. The method of claim 17, wherein the fluid pump includes an electromagnetic actuator, the gasket has a magnetic material the electromagnetic actuator is operated to elongate and/or compress the elastic body by interacting with the magnetic material.

19. A microvalve for a fluid pump, comprising:
- a pump body having an opening that is fluidly connected to a pump chamber; and
- a valve seat arranged around the opening and protruding with an undeformed height from the opening into the pump chamber in a direction toward a diaphragm, the diaphragm is deflectable and operable to close and open a fluidic pathway of the opening by moving into and out of contact with the valve seat, the valve seat having an elastic body, a gasket with a sealing surface, and an actuation region adapted to be actuated by an applied fluidic pressure in a direction from the opening toward the pump chamber, the elastic body is stretchable and has a height that is increased when the pump diaphragm is deflected away from the pump body from a state in which the pump diaphragm is separated from the valve seat.

20. The microvalve of claim 19, wherein the valve seat has an elastic valve holder attaching the valve seat to the pump body.

21. The fluid pump of claim 1, wherein the pump diaphragm is a single deflectable membrane that provides a unidirectional flow between the inlet and the outlet.

* * * * *